(12) United States Patent
Allan

(10) Patent No.: US 7,680,923 B1
(45) Date of Patent: Mar. 16, 2010

(54) CONNECTIVITY ASSESSMENT FOR LABEL DISTRIBUTION PROTOCOL (LDP) NETWORKS

(75) Inventor: David Allan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1408 days.

(21) Appl. No.: 10/745,061

(22) Filed: Dec. 22, 2003

Related U.S. Application Data

(63) Continuation-in-part of application No. 10/385,995, filed on Mar. 11, 2003.

(60) Provisional application No. 60/454,452, filed on Mar. 13, 2003.

(51) Int. Cl.
G06F 15/173 (2006.01)
G06F 15/16 (2006.01)

(52) U.S. Cl. .................. 709/224; 709/201; 709/203; 709/238

(58) Field of Classification Search .......... 709/224, 709/201, 203, 238
See application file for complete search history.

(56) References Cited

U.S. PATENT DOCUMENTS

| 6,693,881 | B1 * | 2/2004 | Huysmans et al. ....... 370/236.1 |
| 6,785,237 | B1 * | 8/2004 | Sufleta ................... 370/236 |
| 7,336,615 | B1 * | 2/2008 | Pan et al. ................ 370/248 |
| 2003/0043755 | A1 * | 3/2003 | Mitchell .................. 370/252 |
| 2003/0097438 | A1 * | 5/2003 | Bearden et al. ............ 709/224 |
| 2003/0112760 | A1 * | 6/2003 | Puppa et al. ............ 370/241.1 |
| 2004/0156313 | A1 * | 8/2004 | Hofmeister et al. ........ 370/229 |
| 2008/0095045 | A1 * | 4/2008 | Owens et al. ............. 370/220 |

* cited by examiner

*Primary Examiner*—Ario Etienne
*Assistant Examiner*—Sahera Halim
(74) *Attorney, Agent, or Firm*—David A. Dagg

(57) ABSTRACT

Probe and stop probe messages associated with an ingress access point are processed at an egress label switched router. The ingress access point may consist of an identifier of an ingress network element, in combination with a LSP identifier provided by the ingress network element. Auto-registration is performed upon receipt of a probe message indicating an ingress access point not currently being tracked. In the event that a probe message is received indicating an ingress access point not currently being tracked, the egress label switched router adds an entry to a tracking data structure, and a central processor is notified. Each entry within the tracking data structure stores information for a corresponding ingress access point, including knowledge digests from probe messages and an indication of the time a last previous probe message was received. As probe and stop probe messages are received, the knowledge digests they include are compared with the knowledge digests stored in the corresponding tracking table entries. In the event of a conflict between a received knowledge digest and a stored knowledge digest, a predetermined action is taken, such as generation of a misbranching alarm. The knowledge digests may, for example, be Bloom Filters. In the event a stop probe message is received for an ingress access point associated with one of the entries in the tracking table, the corresponding tracking entry is removed.

19 Claims, 31 Drawing Sheets

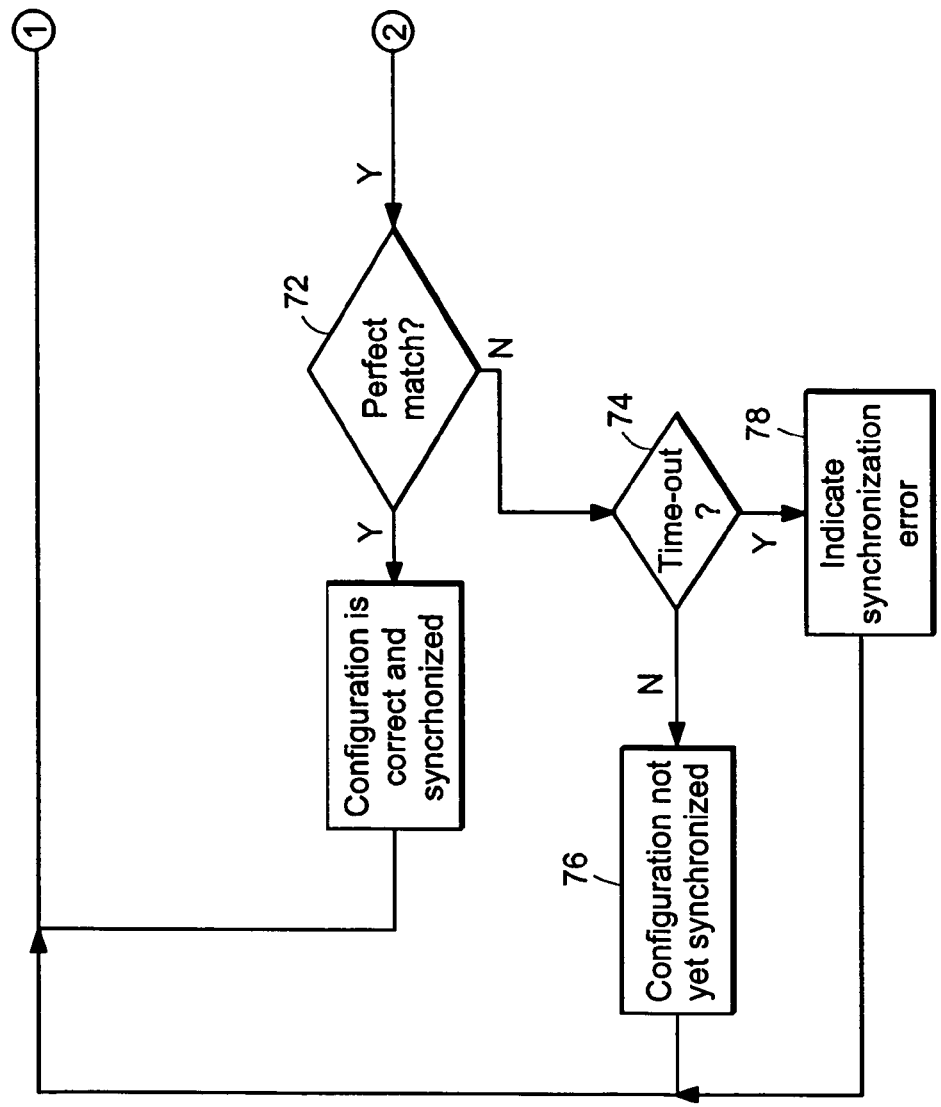

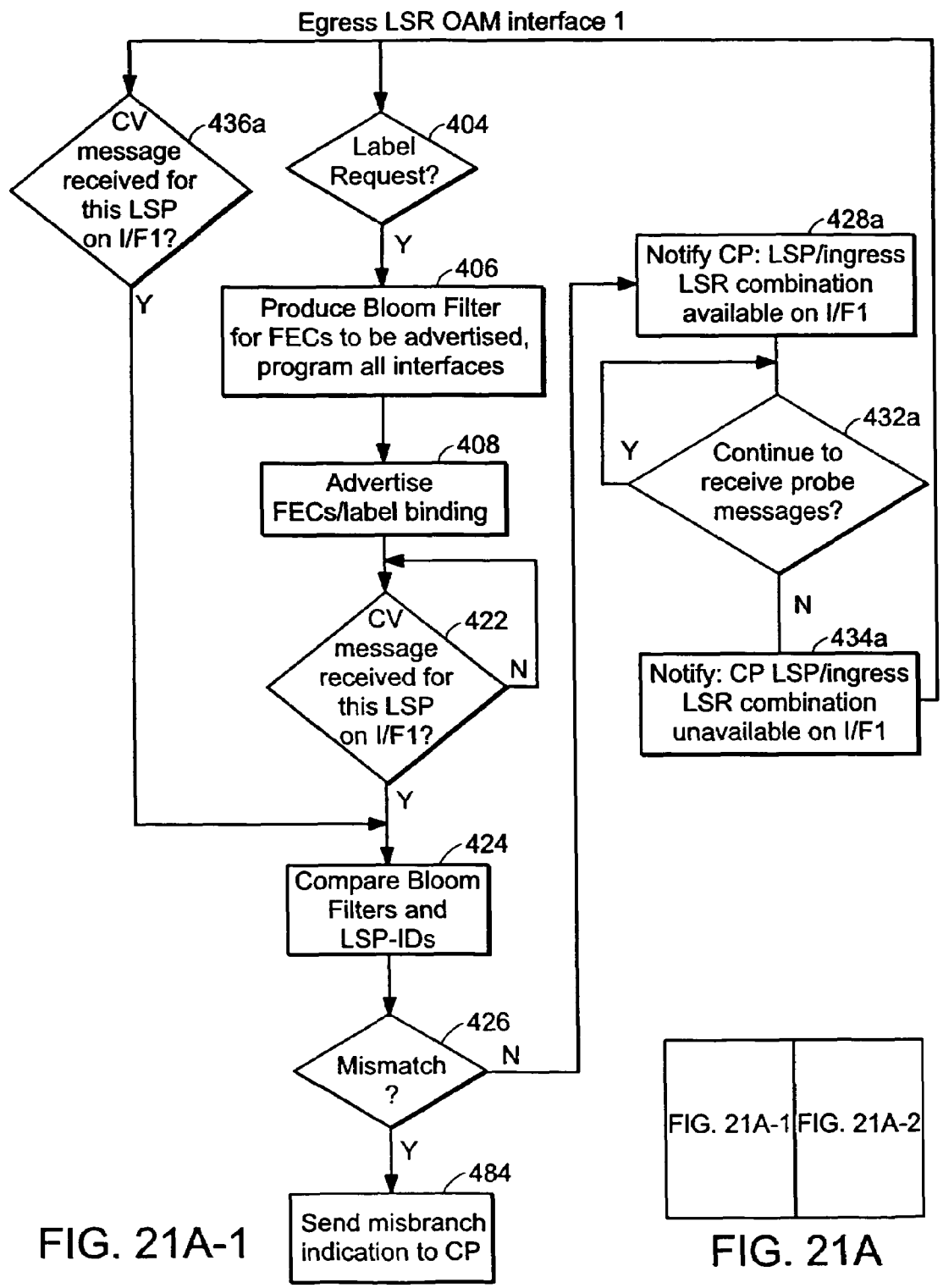

CONNECTIVITY ASSESSMENT FOR LABEL DISTRIBUTION PROTOCOL (LDP) NETWORKS

CROSS REFERENCE TO RELATED APPLICATIONS

This application claims priority under 35 USC §119(e) to provisional application Ser. No. 60/454,452 entitled "AVAILABILITY MEASUREMENT FOR LDP NETWORKS", and filed Mar. 13, 2003, and is a Continuation in Part of U.S. patent application Ser. No. 10/385,995, entitled "AVAILABILITY MEASUREMENT IN NETWORKS", filed Mar. 11, 2003.

FIELD OF THE INVENTION

The present invention relates generally to measuring the availability of communication resources between devices, and more particularly to mechanisms for measuring the presence of connectivity between network devices, where connectivity consists of both a viable route and a forwarding path.

BACKGROUND OF THE INVENTION

In order to charge their customers properly, and generally for purposes of effective network administration, network service providers have a strong interest in accurately determining the presence of connectivity within their networks. This is true for many specific types of networks, including networks using Multi-Protocol Label Switching (MPLS). MPLS is a standard technique for routing packets over label switched paths (LSPs) in an internet protocol (IP) network, using labels that are attached to IP (Internet Protocol) packets. Traffic in MPLS networks is organized into forwarding equivalence classes (FECs). A given label switched path may carry traffic associated with one or more FECs. The routers forwarding packets within an MPLS network are referred to as label switched routers (LSRs).

A number of challenges exist in determining the presence of connectivity between LSRs in an MPLS network. For example, it would be desirable to monitor connectivity over a path between an ingress LSR and an egress LSR, with respect to the ingress LSR in combination with identification of the LSP at the ingress LSR. For purposes herein, the combination of an identifier of such an ingress LSR and a local identification of the LSP at that LSR is referred to as an ingress access point of the LSP. A system that addresses this need should be designed to accommodate the fact that an egress LSR for an LSP has no a priori knowledge of the set of relevant ingress access points for a given FEC. Additionally, over time, the set of ingress access points, or the egress LSR for a label switched path (LSP) may change. Further complications result from the fact that LSRs at the edge of a network may use multiple interfaces to forward traffic for a given FEC, in order to provide load balancing.

These and other conditions result in a need for a new system for measuring connectivity between LSRs in an MPLS network.

SUMMARY OF THE INVENTION

In order to address the aforementioned technical needs and others, a message driven system and method are disclosed for operation in a network device such as an egress label switched router (LSR). The disclosed system operates to monitor received traffic for probe and stop probe messages associated with an ingress access point. For purposes of explanation, a specific LSP ingress point is identified via the identifier of the ingress network element, such as an LSR, in combination with an LSP identifier provided by the ingress network element, and will be referred to herein as an ingress access point.

The disclosed system operates to perform auto-registration actions upon receipt of a probe message indicating an ingress access point not currently being tracked. In the event that a probe message is received indicating an ingress access point not currently being tracked, the egress LSR adds an entry to a data structure, such as a tracking table, storing a number of tracking entries. A central processor in the egress LSR is also notified that the new entry has been added to the tracking table. Each tracking entry within the tracking table stores information associated with a corresponding ingress access point. Such entries include information such as knowledge digests from probe messages for the corresponding ingress access point, and an indication of the time a last previous probe message was received for the corresponding ingress access point. As probe and stop probe messages are received, the knowledge digests they include are compared with the knowledge digests stored in the corresponding tracking table entries. In the event of a conflict between a received knowledge digest and a stored knowledge digest, a predetermined action is taken, such as generation of a misbranching alarm. The knowledge digests may, for example, be Bloom Filters. In the event a stop probe message is received for an ingress access point associated with one of the entries in the tracking table, the corresponding tracking entry is removed.

A background process in the egress label switched router further operates to monitor times since previous probe messages have been received for specific ingress access points. In the event that a predetermined time passes without receipt of a probe message for a given ingress access point, the background process removes the corresponding tracking table entry and notifies the central processor in the egress LSR that the entry has been removed.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
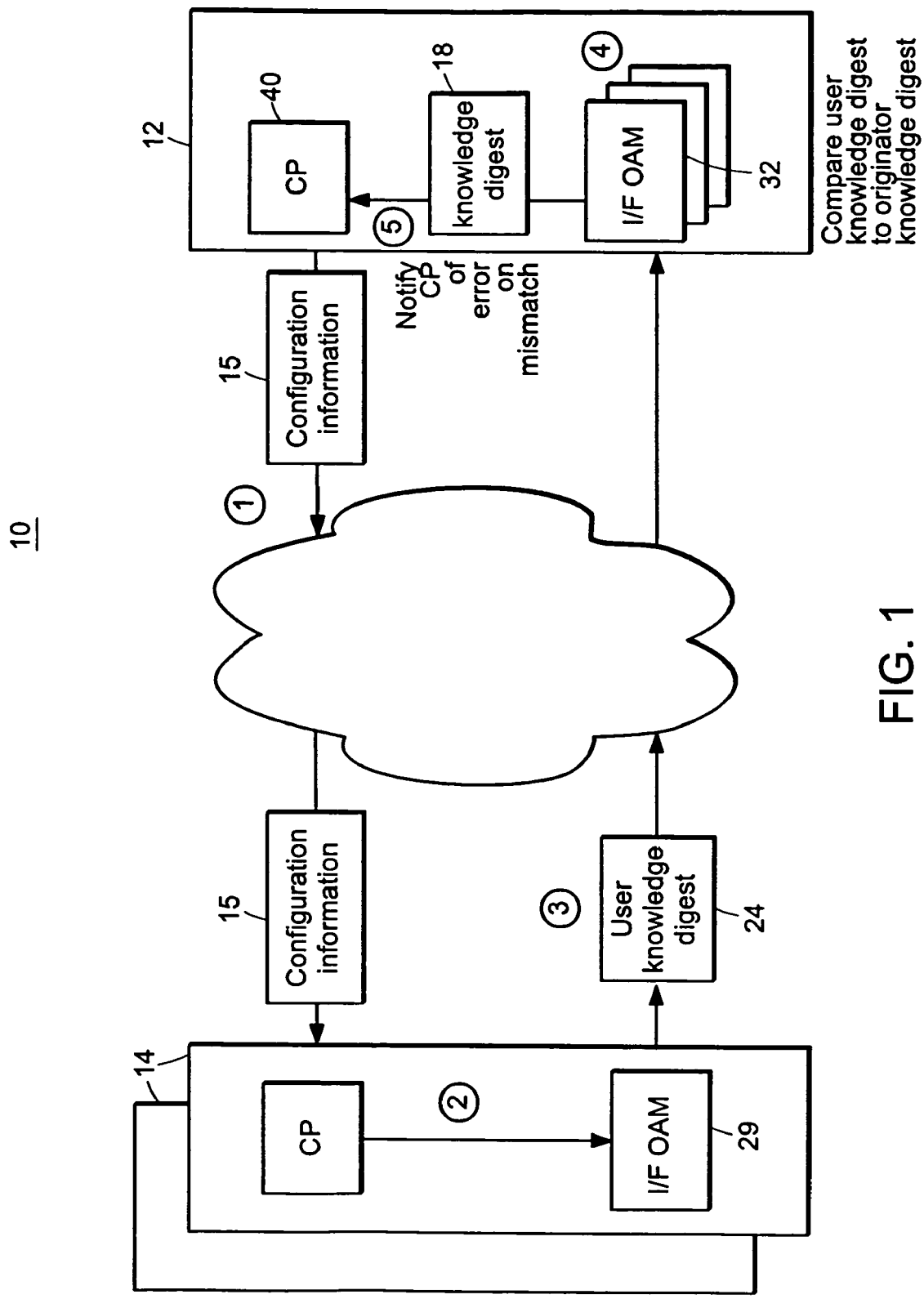
FIG. 1 is a schematic representation of a generic system environment in which the principles of the invention can be employed.
Figure 2A:
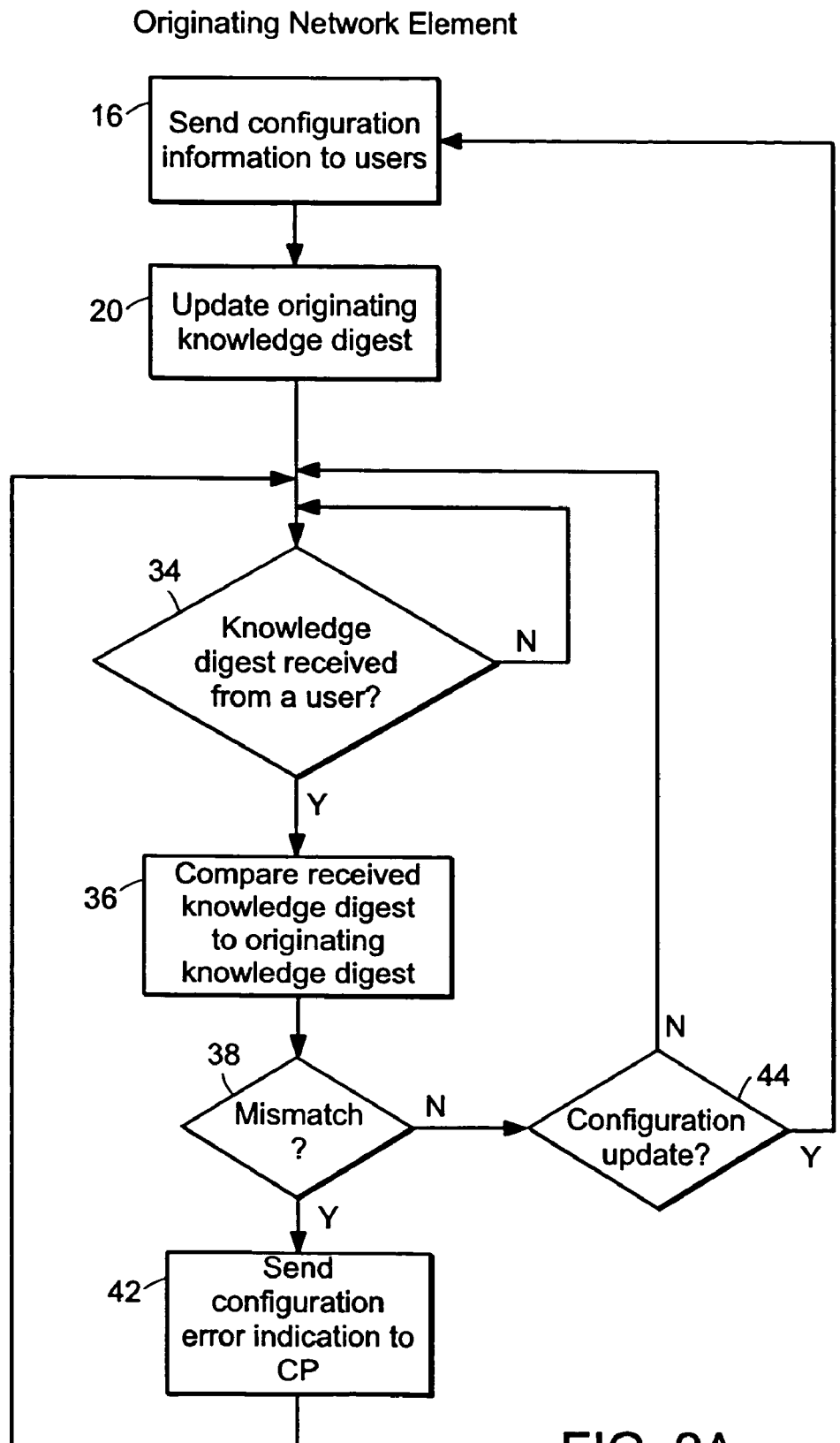
FIG. 2 presents flow diagrams representing the operation of the originating and user elements of FIG. 1.
Figure 2B:
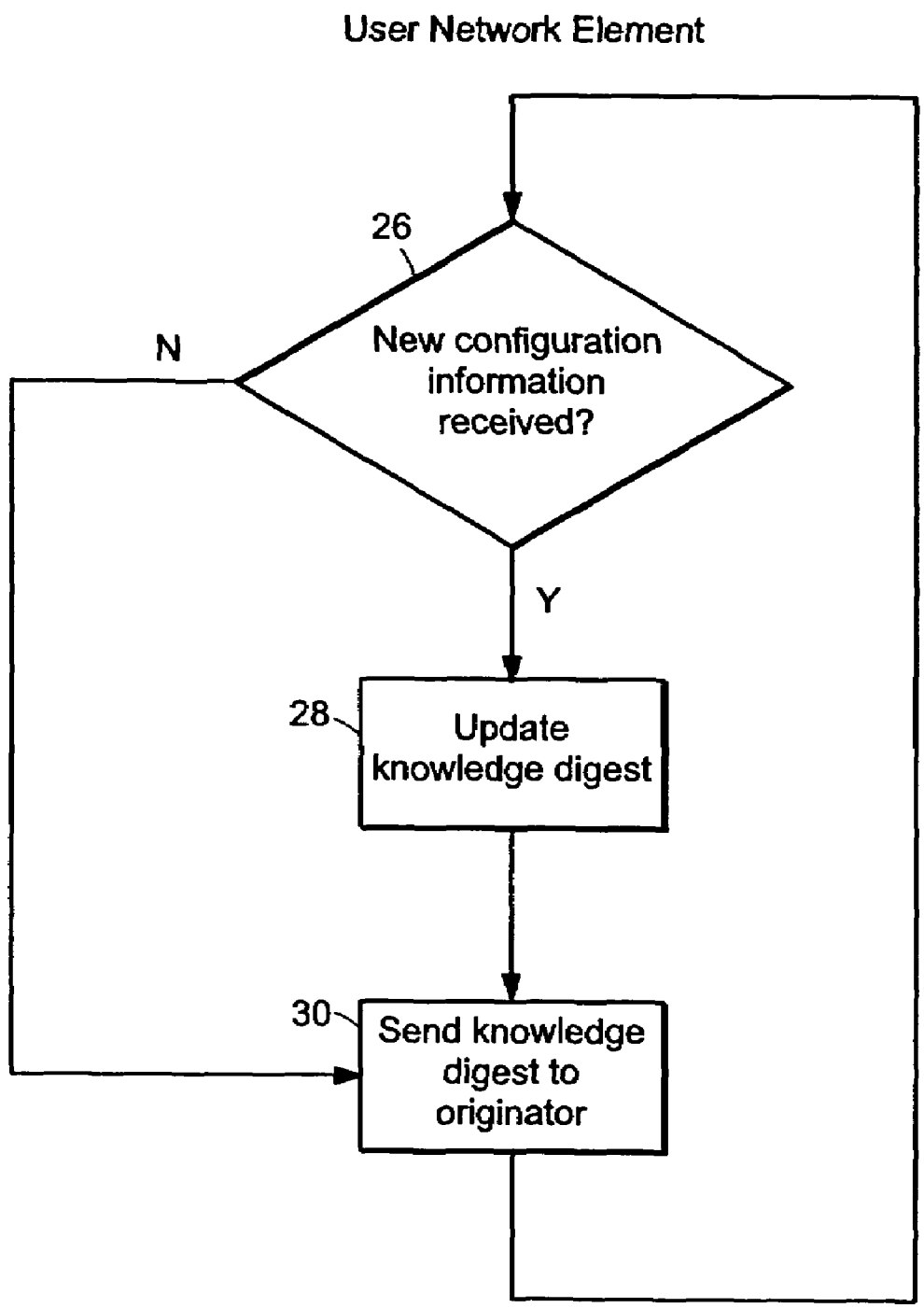

This application claims priority under 35 USC §119(e) to provisional application Ser. No. 60/454,452, entitled "AVAILABILITY MEASUREMENT FOR LDP NETWORKS", and filed Mar. 13, 2003, all disclosures of which are hereby included by reference herein, and is a Continuation in Part of U.S. patent application Ser. No. 10/385,995, entitled "AVAILABILITY MEASUREMENT IN NETWORKS", filed Mar. 11, 2003, all disclosures of which are hereby included by reference herein.

In many system environments, configuration information is associated with two or more communicating devices. In some such systems, one device originates the configuration information, and one or more other devices use the configuration information. The configuration information is often time varying in nature. One example of such a system is a provisioned networking environment. One system in the networking environment, herein referred to as an originating network element, communicates configuration information to other systems—referred to as user network elements—in the networking environment. The configuration information may be related, for example, to communications paths employed by the users to reach the originating network element, or for service parameters associated with those paths, or the like. In such systems, it is advantageous to be able to verify that the configuration information used by a system is in fact the correct configuration information and when explicitly associated with connectivity, simultaneously verify the connectivity is similarly correct. In the network system example, it is advantageous to be able to verify that the configuration information used by a user network element is consistent with the configuration information that was actually issued to it by the originating network element.

Furthermore, configuration information in such systems may change over time or have subtle differences due to filtering by the user network element. For example, in a networking environment, configuration information issued by an originating network element to user network elements may need to be updated periodically because of routing changes. Such a re-configuration results in a finite delay in synchronizing the sets of configuration information between the originating network element and the user network elements. So, when verifying configuration information, it is further advantageous to be able to ascertain whether a configuration mismatch is a result of a configuration change that has not yet propagated through the system (which may be considered to be an artifact of normal network operations) as opposed to a genuine configuration or connectivity problem.

Configuration information associated with such systems is often complex, and a given system might maintain configuration information for a large number of other systems. Where it is desirable to periodically verify configuration information, it is often unreasonable to do so by distributing and comparing the configuration information itself, because the overhead of doing so is too intensive. Furthermore, comparison of complex configuration information in, for example, a given network element would most likely occur in software on a central processor (rather than in a distributed, per-interface manner), further over-tasking the system.

In accordance with the principles of the invention, it is possible to efficiently verify configuration information between two systems without the need to transfer the configuration information in its entirety between systems. This allows the systems operator to verify that there is no misconfiguration—i.e. the device that originates the configuration information has the same overall system view as the devices that are receiving it; further, when the configuration is explicitly associated with connectivity between the systems, that there is no misdirection of information—i.e. the connectivity between devices has not been misdirected. Further, the systems operator can verify that incremental changes to configuration information are propagated in a reasonable amount of time, and that connectivity has been maintained between the originating devices and user devices.

It should be understood that, for all general and particular systems to which the following described principles of the invention may apply, communication may occur at many different layers between the devices that comprise the system. Thus, a device may be an originating device with regard to one application, while also being a user device with regard to another application. For example, in a networking environment, an internetworking gateway between an ATM and MPLS networks may originate path configuration information at the ATM level, but may at the same time be a user of MPLS configuration information originated from another switch. So, one skilled in the art will understand from the teachings herein that many instantiations of origination and user modes may exist within one device, operating concurrently.

Figures 2, 21A:
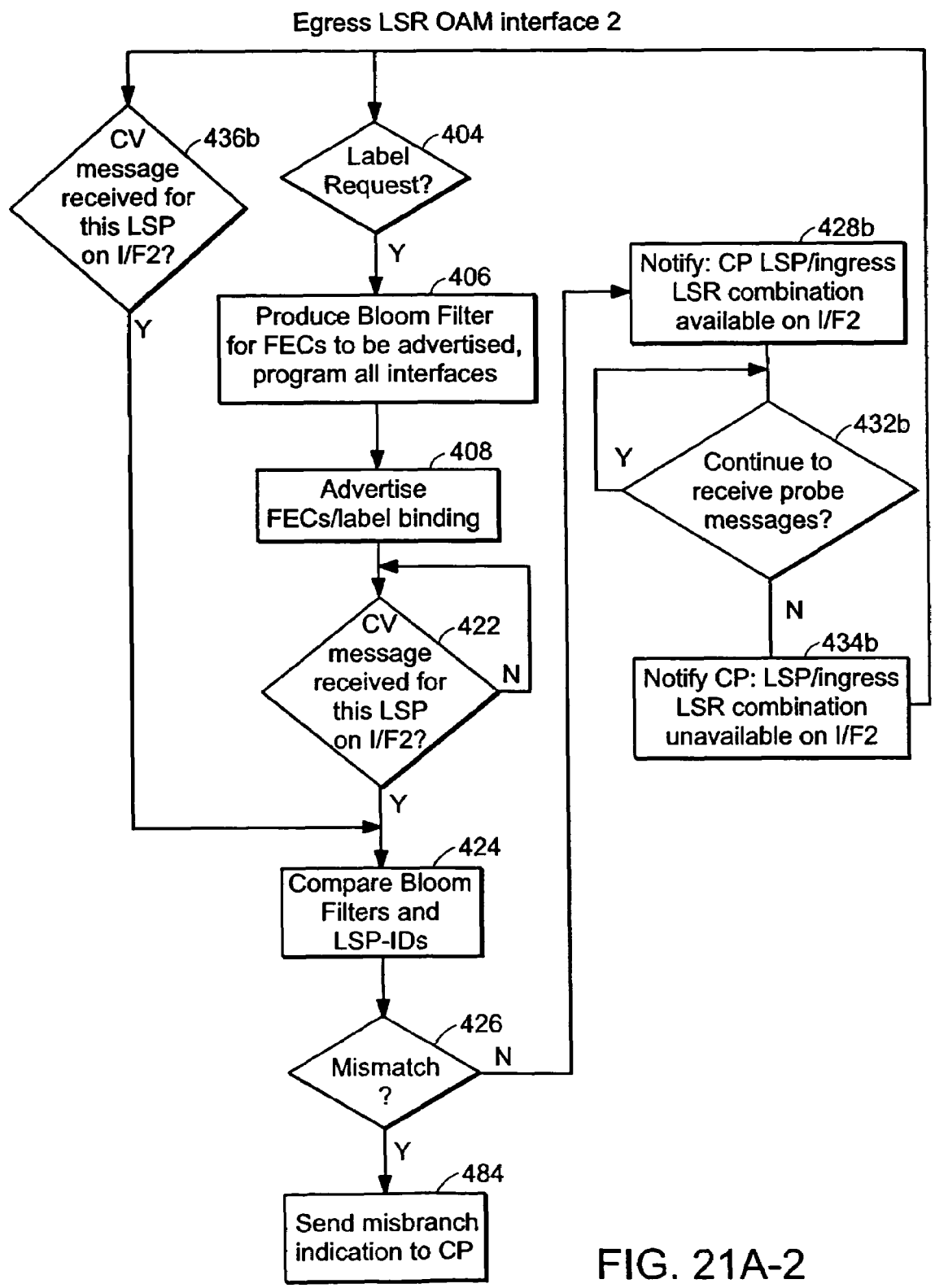

Referring now to FIG. 1, there is shown a generalized networking system 10 in which the principles of the invention are employed. Referring also to FIG. 2, the processes used by the originating network element 12 and a user network element 14 are shown. An originating network element 12 maintains configuration information 15 which may be related to connection paths to other network elements, or to characteristics associated with those paths, or the like. The originating and user network elements operate as follows:

1. The configuration information 15 is distributed to other user network elements 14 in accordance with the networking system protocols in known manners (step 16). In accordance with the invention, the originating network element 12 also encodes the configuration information into a knowledge digest 18 (step 20).
2. The user network elements 14 also encode the configuration information that they have most recently received from the originating network element 12 into a knowledge digest 24 (steps 26, 28).
3. The user network elements 14 periodically forward their user knowledge digests 24 from a user interface 29 to the originating network element 12 (step 30).
4. The interface 32 within the originating network element 12 that receives the knowledge digest 24 compares the knowledge digest 24 to the knowledge digest 18 that it maintains for the given user network element 14 (steps 34, 36). A mismatch indicates that the configuration information sent by the originating network element 12 does not match the configuration information currently in use by the user network element 14 (step 38).
5. The originating network element 12 can then notify, for example, central processing resources 40 within the network element 12 that there may be a misconfiguration (step 42). Or, further analysis may occur as will be further described. If there is no mismatch, then the configuration information is consistent between the originating network element 12 and the user network element 14. If there has been a configuration update (step 44), the originating network element will issue the new configuration information (step 16) and update its knowledge digest (step 20). Otherwise, the originating network element will continue to monitor incoming user knowledge digests (step 34).

Figure 3:
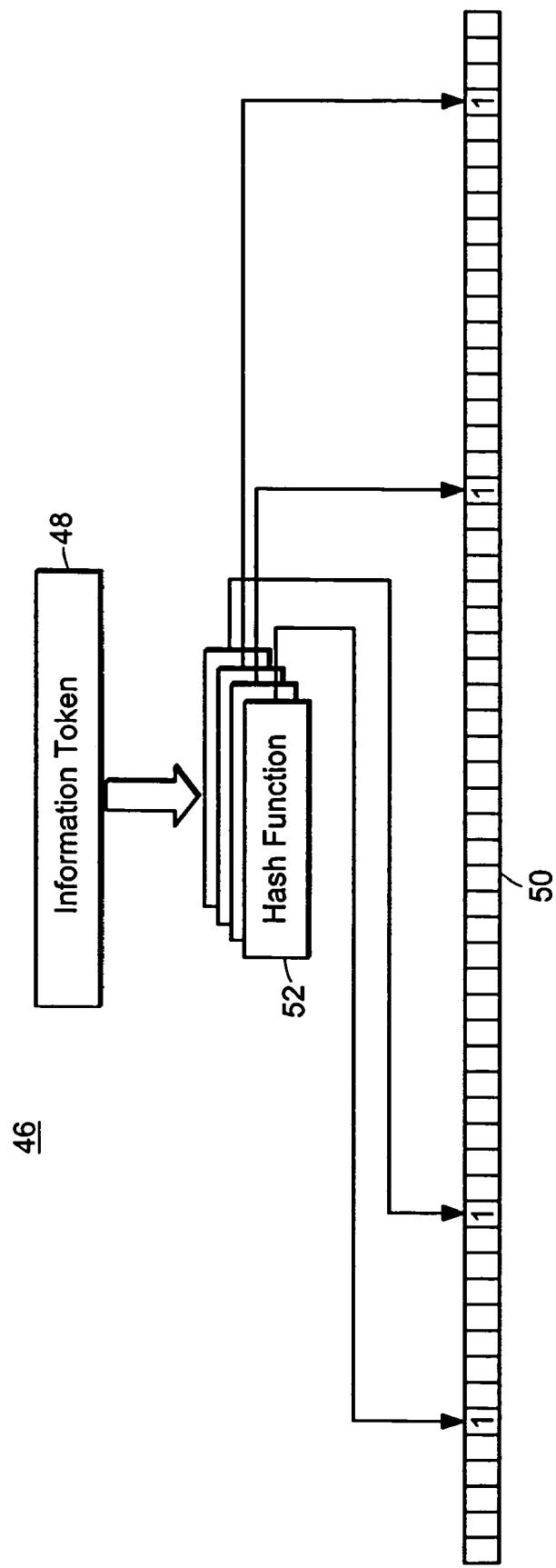
FIG. 3 is a representation of a Bloom Filter.

One mechanism for providing a knowledge digest with the desirable properties is known as a bloom filter. A bloom filter is a fixed length lossy knowledge test implemented as a bit array. As shown in FIG. 3, a bloom filter 46 uses hashing techniques to condense a representation of a token of information 48 from a set into one or more bits in a bit array 50. One or more hashes 52 of the information token (e.g. network configuration information) is taken, modulo the length of the bit array 50. The result is used as an offset into the array, to set the bit at that location in the array. The set bit represents the existence of the token of information in the set. If the length of the bit array 50 is less than the size of the set of information tokens 48 (as it should be when used for compression purposes), then there is a given probability that more than one token will hash to the same value. In this scenario the bit being set represents a probability of the token being in the set. If the bit is not set, the probability of set membership is zero. Filter engineering can produce a very high probability that a set bit represents the existence of the information token in the set. The probability of obtaining a false positive result from a bloom filter is:

$$P_{err} = (1-(1-1/m)^{kn})^k$$

Where m=filter size, k=number of hash functions used, and n=number of elements in the set (e.g. number of FECs per LSP). The larger the length of the filter, the smaller the probability of a false positive. However, the length of the filter affects the CV PDU size and makes implementation demands, and so should not be excessively large. Filter operations are most easily performed if the filter size is based on a power of 2 and results in a filter of some even number of octets in length. Increasing the number of hashes also decreases the likelihood of obtaining false positives below a given density of information encoded in the filter. Many known hash algorithms may be used, for example CRC polynomials, MD2, MD5, SHA1, or SHA256 (although a number of these are cryptographic hashes and have properties beyond the simple randomization that a bloom filter requires). The number of undetected faults will rise slightly where there is more than one element per filter.

When considering a mix of applications sharing a network, one skilled in the art will realize that different applications will have different configuration requirements. The number of tokens that needs to be uniquely identified varies significantly. For example, in a VPN application, between any two provider edge devices, the transport network may only need to encode a single token describing connectivity with a target edge device, while the service layer may need to associate a number of customer routes and other configuration details with the service connectivity. This suggests that in a network that contains a mixture of applications, no one set of filter coding rules will optimize error detection across the set of applications supported by the network.

When considering detecting misconfiguration and misbranching for filters with heterogeneous coding rules, the generalized equation for false positives can be modified:

$$P_{err} = (1-(1-1/m)^{kn})^{pq}$$

Where m=the filter length, k=the number of bits per token used by the originator, n is the number of tokens encoded in the originator filter, p is the number of bits per token employed by the user and q is the number of user tokens encoded in the user filter. When minimum, maximum and average tokens per application are known, this generalized equation permits a weighted matrix to be defined such that filter engineering can be tuned for each application relative to both itself and the other applications supported by the system in order to optimize overall fault coverage.

Figure 4:
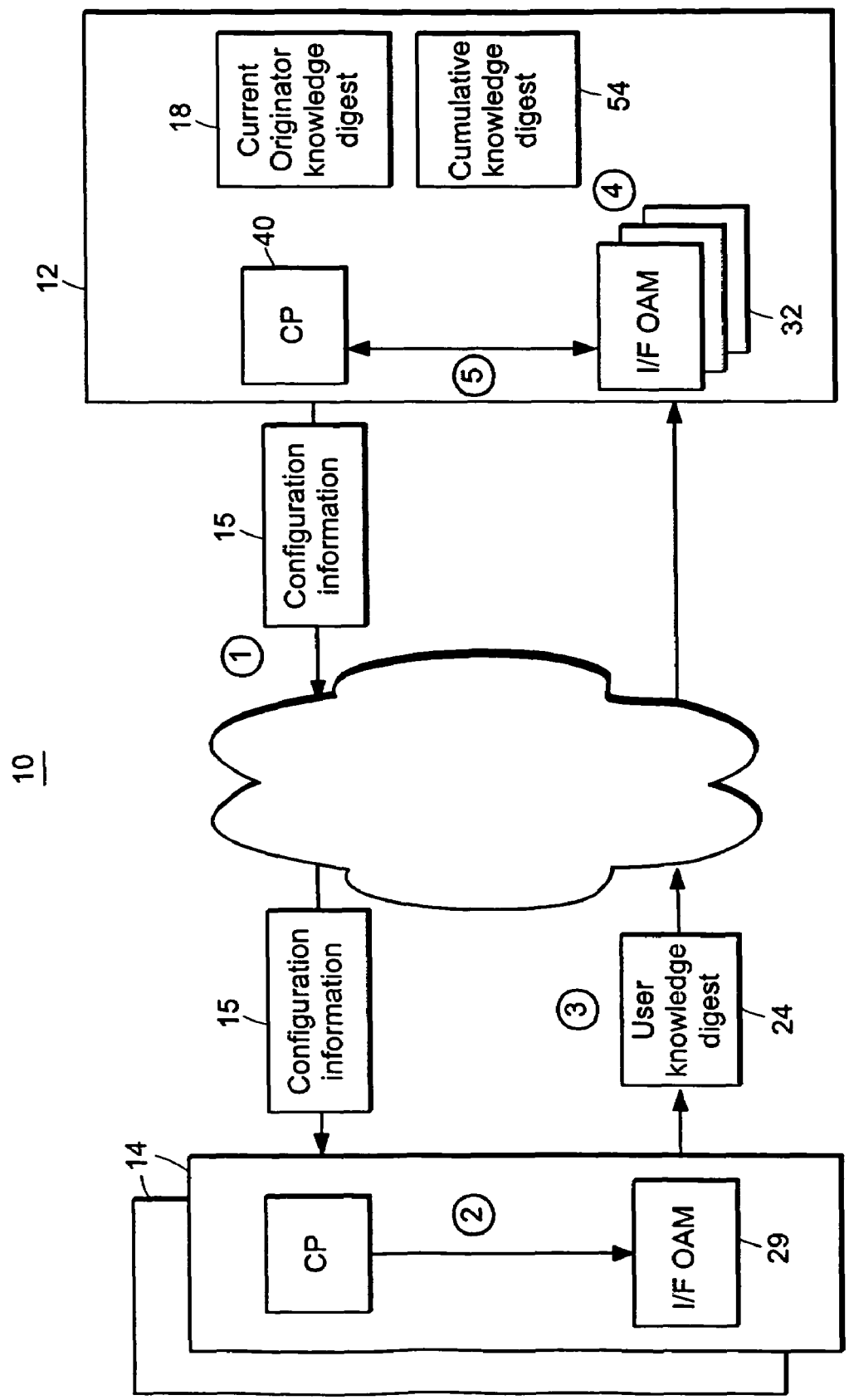
FIG. 4 is a schematic representation of a generic system environment in which several knowledge digests may be used in accordance with the invention.

Referring now to FIG. 4, a variation on the generalized network of FIG. 1 is shown, wherein the configuration verification mechanism is tolerant of transient changes in configuration information. The originating network element 12 is herein shown to maintain two knowledge digests, a current knowledge digest 18 and a cumulative knowledge digest 54. The current knowledge digest 18 encodes the currently distributed configuration information, as previously described. The cumulative knowledge digest 54 encodes the cumulative set of configuration information that has been distributed over some time. In a properly operating system there may be two outcomes (which are specific characteristics of the application being verified):

1) The current knowledge digests should eventually be identical at both the user and originating systems.

2) The user digest will be a subset of the originator digest (as a result of allowed user policy, or policy applied at some intermediate element).

But, certain transient exceptions are tolerated (and in fact should be tolerated in order avoid false failure notification). For example, when the user network element 14 receiving the configuration information produces a knowledge digest 24 that is a subset of the current knowledge digest 18 encoding the configuration information sent from the originating network element 12, this may indicate that configuration information has been added to the system, but this information has not yet propagated to the user network element 14. Also, when the knowledge digest 24 is a superset of the current knowledge digest 18, but not a superset of the cumulative digest 54, this may indicate that some configuration information has been removed, but that this information has not yet propagated to the user network element 14. Both such scenarios should be tolerated for some finite amount of time to allow system synchronization. After a predetermined amount of time, if synchronization has not occurred, an error is indicated.

Figure 5B:
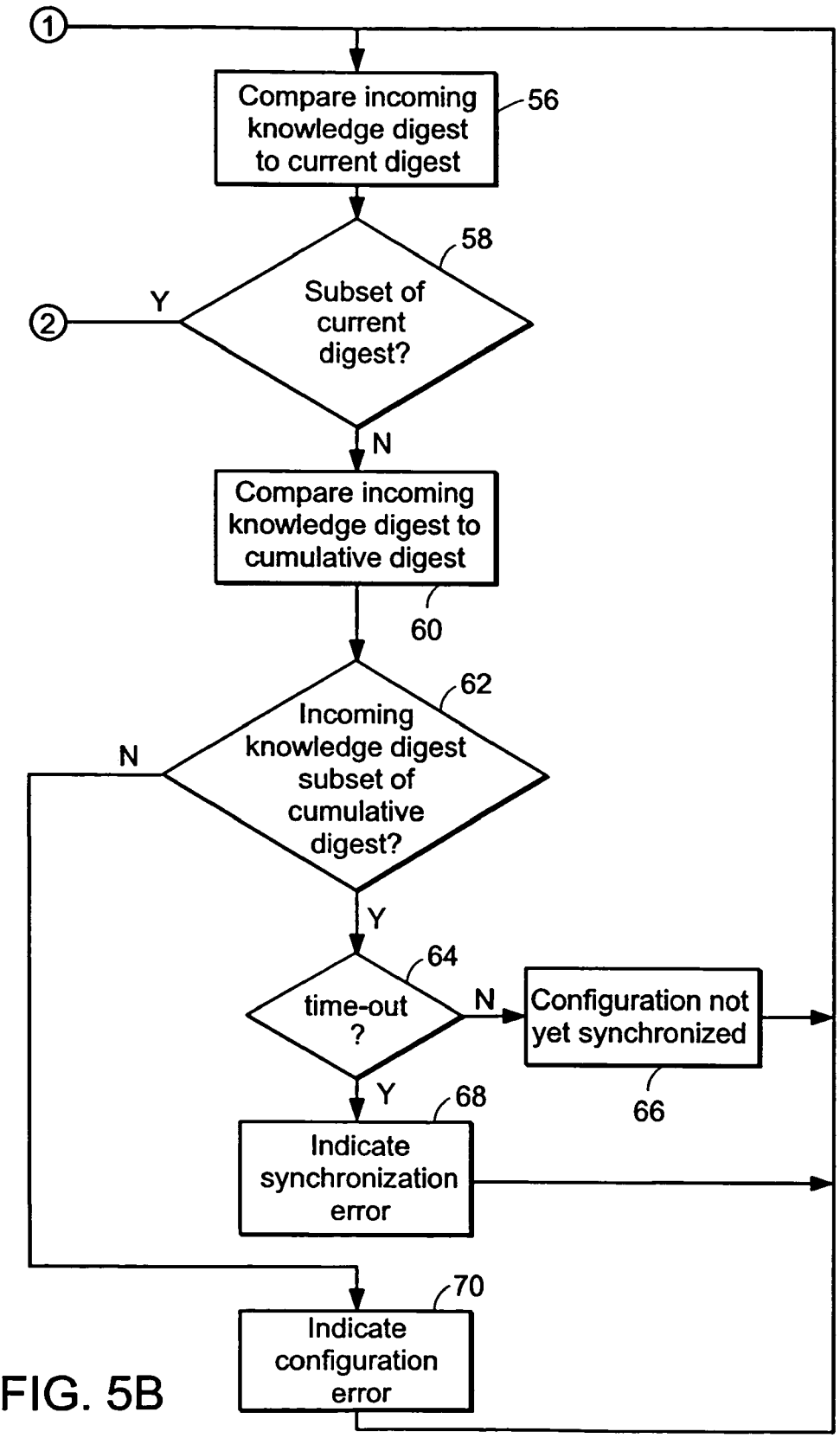
FIG. 5 is a flow diagram representing the operation of the originating element of FIG. 4.

Referring to FIG. 5, there is shown the process by which the current knowledge digest and cumulative knowledge digest are used by the originating network element 12 to ascertain whether configuration errors exist or whether the system is merely not yet synchronized. At step 56, the incoming knowledge digest 24 received from the network element 14 is compared to the current knowledge digest 18. If the incoming knowledge digest 24 is not a subset of the current knowledge digest 18 (step 58), then the incoming knowledge digest 24 is compared with the cumulative knowledge digest 54 (step 60). If the incoming knowledge digest 24 is a subset of the cumulative knowledge digest 54—that is, if the incoming knowledge digest 24 is the same as, or contains fewer set bits than the cumulative knowledge digest 54 (step 62)—then a synchronization timer is checked (step 64). If the timer has not expired, then it is possible that configuration information has been added by the originating network element 12, but that information has not yet propagated to the network element 14. The interface 32 may or may not choose to notify the central processor 40 that network synchronization has not yet occurred (step 66), and returns to processing incoming knowledge digests. If the timer has expired (step 64), then the network has for some reason failed to synchronize. In this case, an error is indicated (step 68).

Referring back to step 62, if a mismatch exists but the incoming knowledge digest 24 is not a subset of the cumulative knowledge digest 54, then a configuration error is indicated (step 70), because some configuration information exists at the user network element 14 that was never sent from the originating network element 12.

Referring back to step 58, if the incoming knowledge digest is 24 is a subset of the current knowledge digest 18, then it is compared to the current knowledge digest 18 to see if the digests match perfectly. If they match, then the configuration information being used at the user network element 14 is correct and there are no synchronization problems (step 72). If the match is not perfect, then the synchronization timer is again checked (step 74). If the timer has not expired, then it is likely that some configuration information has been removed by the originating network element 12, but that the new information has not yet propagated to the user network element 14. The interface 32 may or may not choose to notify the central processor 40 that network synchronization has not yet occurred (step 76), and returns to processing incoming knowledge digests. If the timer has expired (step 74), then the network has failed to synchronize and a synchronization error is indicated (step 78.)

In the system of FIGS. 4 and 5, the current and cumulative knowledge digests, and the incoming knowledge digests, may be advantageously implemented as bloom filters.

The principles of the invention can be applied in many different types of systems. For example, tunneling architectures can be tested for misconfiguration, leakage between tunnels, misbranching of tunnels, routing system problems, and the like. Several applications of the invention are now described as examples of how the principles of the invention can be adapted to different types of tunnel architectures.

1. MPLS

Figure 6:
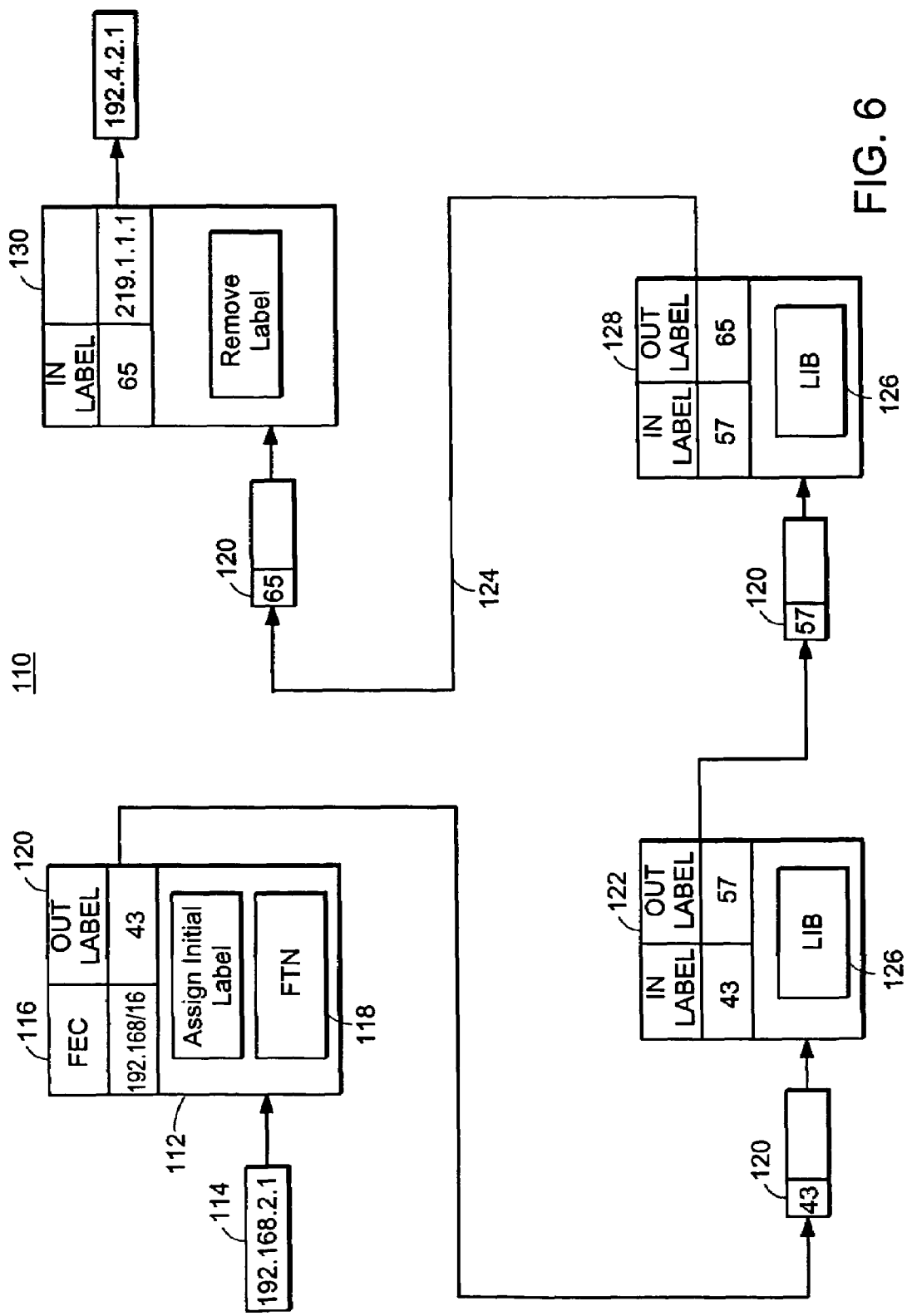
FIG. 6 is a schematic representation of an MPLS network.
Figure 7:
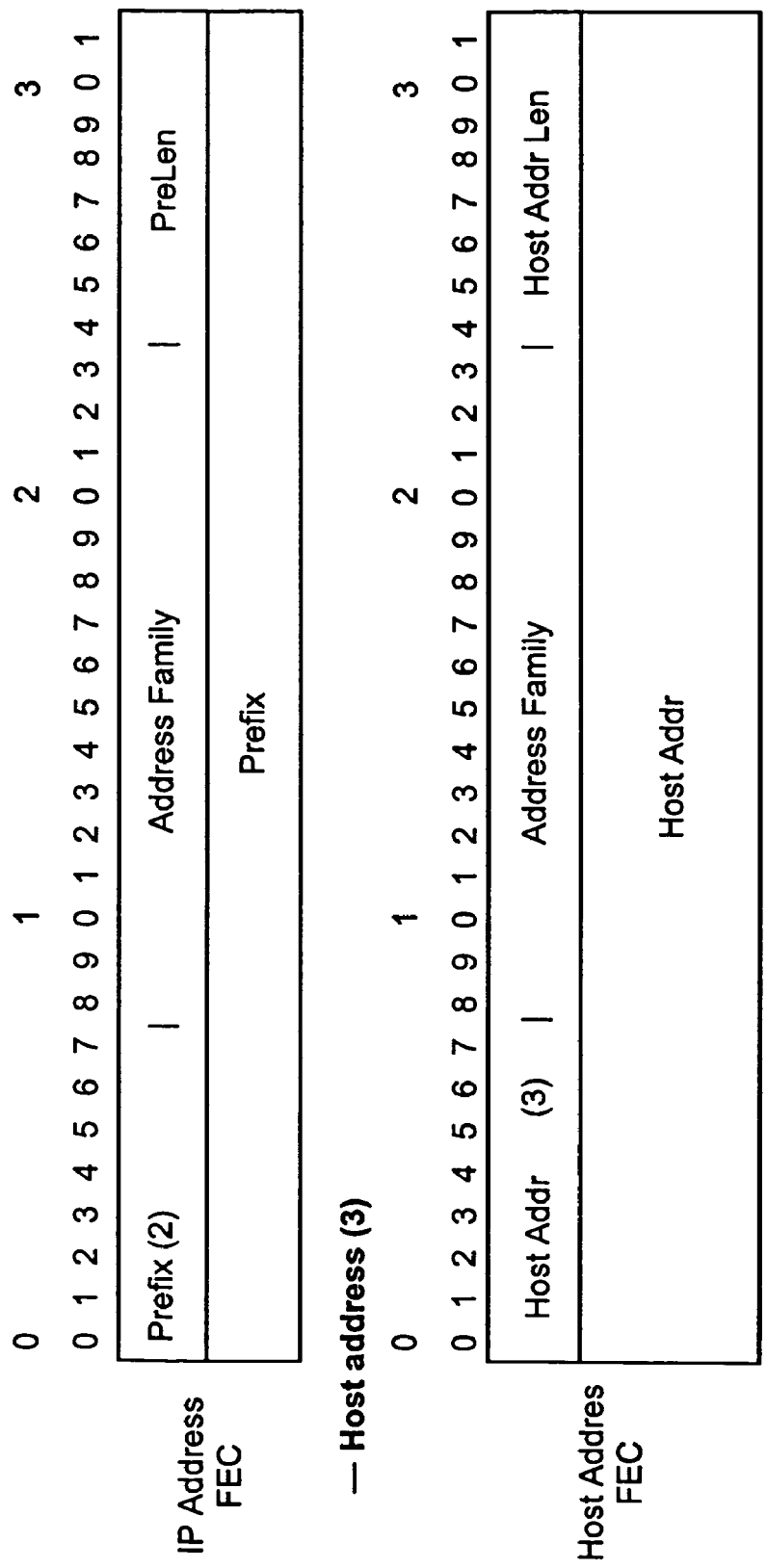
FIG. 7 is a representation of two types of forwarding equivalence classes (FECs) as they are used in the MPLS network of FIG. 1.

In FIG. 6 there is shown a Multi-Protocol Label Switched (MPLS) network 110 in which a verification probe in accordance with the principles of the invention can be used. In an MPLS network, data packets to be forwarded across the network 110 are associated with fixed-length labels and then switched across the network from ingress to egress based on label values. In particular, data packets are received at a network element known as an ingress Label Switched Router (LSR) at the edge of the network 110, such as LSR 112. The ingress LSR 112 examines a received data packet 114 and associates the packet with a forwarding policy indicator known in MPLS as a Forwarding Equivalence Class (FEC) 116. Packets are classified into FECs on the basis of sharing common forwarding policy in the MPLS network. FECs may be assigned for example based on an IP address, or a group of IP addresses, or a host address, or a class or type of service assigned to the packet. An FEC acts as a "functional description" of an LSP independent of the particular instantiation or position in the network topology. Examples of FECs for IPv4 addresses and host addresses in accordance with RFC 3036 is shown in FIG. 7. The ingress LSR 112 indexes an FEC to Next Hop Label Forwarding Entry (FTN) table 118 to retrieve a label 120 that is associated with the FEC for the packet. The label is appended to the packet in any of a number of known ways, dependent upon the type of network upon which the MPLS network is implemented. As herein shown, a packet with IP address 192.168.2.1 is assigned an FEC associated with the group of IP addresses 192.168/16. This FEC is used to index the FTN table 118 and retrieve a label of '43 '. The label '43 ' is appended to the packet, and the packet is then forwarded to the next LSR 122 along a Label Switched Path (LSP) 124. The LSR 122 uses the label '43 ' to index a label information base (LIB) 126 to retrieve a new label, herein shown as '57 '. The LSR 122 swaps the new label '57 ' for the old label '43 ', and forwards the packet to the next LSR 128 along the LSP. The LSR 128 swaps the label in the same manner as the LSR 122 did, swapping the label '57 ' for the label '65 ', and forwards the packet to the next LSR 130 along the LSP 124. As herein shown, the next LSR 130 is an egress LSR—that is, the LSR 130 is the router at which the MPLS LSP is terminated, all labels have been popped from the packet, and the packet is forwarded on to its destination. The LSRs between the ingress and egress LSRs are referred to as intermediate LSRs, and there may be an arbitrary number of them.

Some MPLS networks implement a mechanism known as penultimate hop popping (PHP), wherein the intermediate LSR one hop upstream from the egress LSR pops the top label off the label stack, saving the egress LSR from performing the operation. If PHP were enabled in the network 10 of FIG. 1, then the label '65 ' would have been popped at the intermediate LSR 28.

There are a variety of known ways to configure LSPs. Provisioning, control driven methods, also known as explicitly routed LSPs (ER-LSPs) may be used to create LSPs. In accordance with these methods, the LSP is created by the ingress LSR, which has specified an explicit path to some degree of detail through the MPLS network to the egress LSR. The path is thus considered "source-routed". The end-points of ER-LSPs are fixed at specific interfaces and the LSPs are point to point, so that there is a 1-to-1 relationship between the LSP ingress and LSP egress. Protocols that can be used to configure ER-LSPs include CR-LDP and RSVP-TE.

Application specific mechanisms exist to distributed MPLS labels and associate configuration information with the label. RFC 2547 BGP VPNs use the BGP4 protocol to distribute VPN specific labels, and associate information about the VPN client network with the labels. The LDP protocol includes the ability to distribute labels and configuration information to non-adjacent peers and is used in some proposed implementations of "pseudo wires".

Topology driven methods are also available for configuring what are known as implicitly routed LSPs. Topology driven LSPs are currently created via Label Distribution Protocol (LDP) signaling, and are herein referred to as LDP-LSPs. The principles of the invention can be applied to detect mis-configuration and mis-forwarding across the entire MPLS tunnel architecture, regardless of how the labels are distributed. However, LDP-LSPs presents certain complexities; therefore, the application of the invention to LDP-LSP tunnels is herein described in detail.

Figure 8:
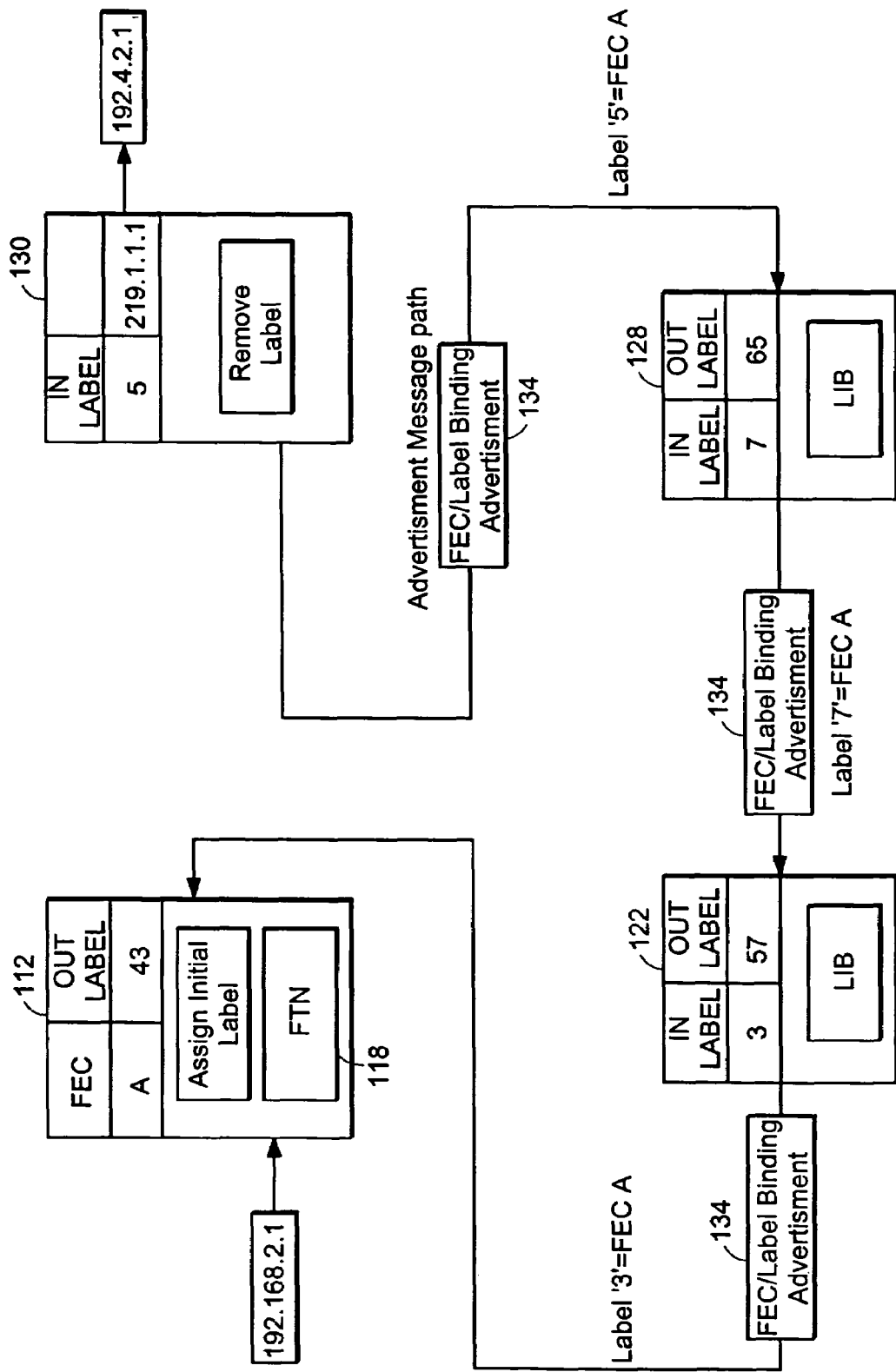
FIG. 8 is a schematic representation of how labels are bound to FECs in accordance with the downstream unsolicited label distribution protocol.

Referring to FIG. 8, one mechanism used by LDP for label distribution is known as "downstream unsolicited" label distribution. The egress LSR 130 advertises label/FEC bindings by sending Advertisement messages 134 containing the FEC/label bindings to its peers, herein intermediate LSR 128. Each intermediate LSR along the path compares the label advertisements with its local routing database and configures itself to use the best path for a given FEC based on network routing information available to it. The Advertisement messages 134 eventually propagate to the ingresses, but only knowledge of the FEC is preserved, identification of the egress LSR originating the advertisement is not propagated.

Figure 9:
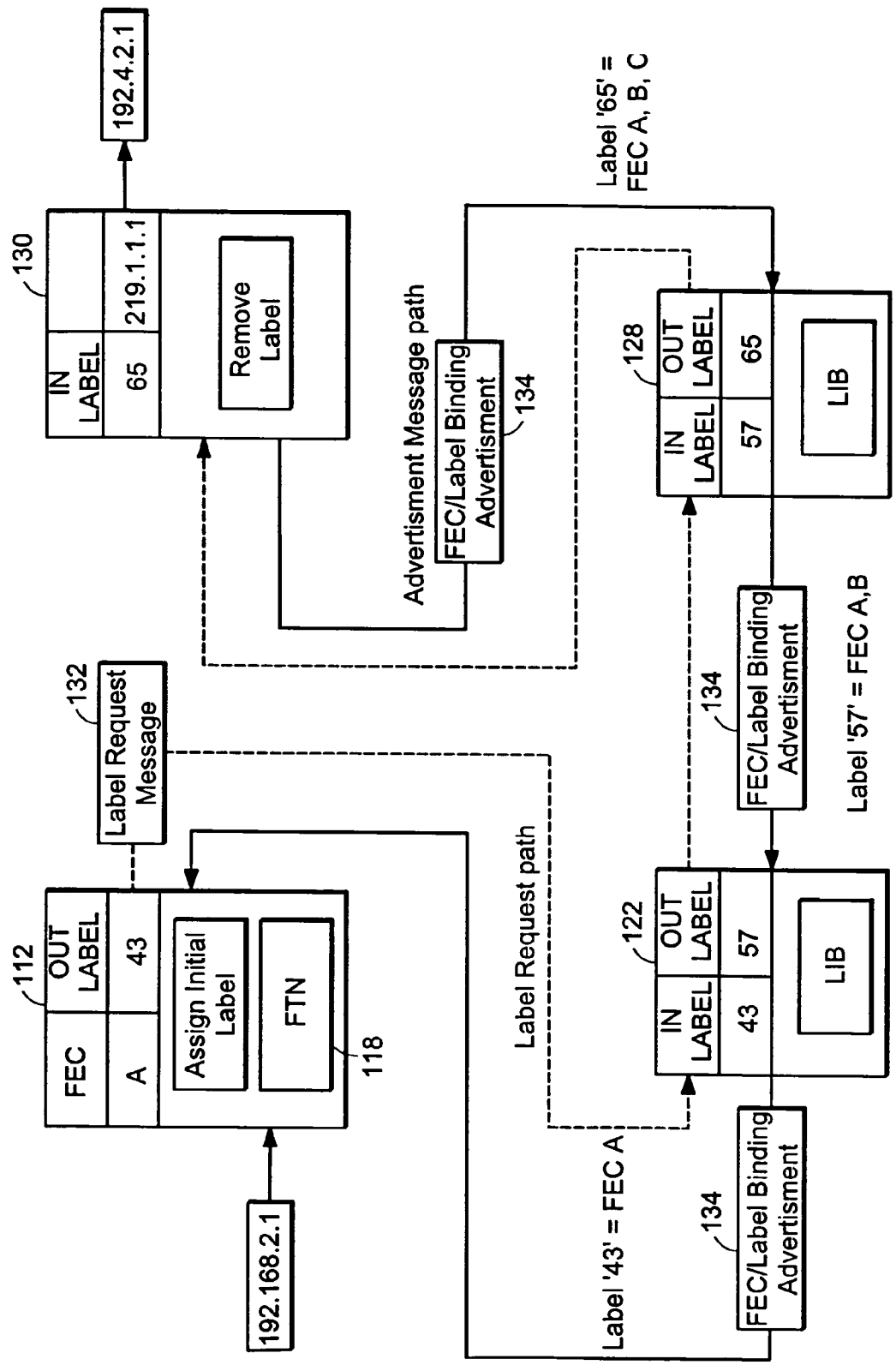
FIG. 9 is a schematic representation of how labels are bound to FECs in accordance with the downstream on demand label distribution protocol.

Referring now to FIG. 9, there is shown another type of label distribution used by LDP, know as "downstream on demand" label distribution. An ingress LSR 112 forwards a label request message 132 into the MPLS network. The label request message 132 propagates downstream. If a downstream LSR receiving the label request message 132, already has an LSP set up for the FEC requested, it returns the label that maps the FEC into the existing LSP in an LDP Advertisement message 134. If it does not have an LSP set up for the FEC requested, it sends a label request message 132 to the next downstream LSR. If no labels have been set up for the FEC at all, then the label request message 132 is eventually received a viable egress LSR for the FEC 30, which assigns a label for the one or more FECs and forwards the label back through the MPLS network in an LDP Advertisement message 134. Advertisements proceed back towards the ingress LSR, which receives the final Advertisement including a label for forwarding to the next hop LSR for the LSP. It is this label that the ingress LSR 112 stores in its FTN 118 for the FEC. According to this process, the egress LSR 130 may associate a group of FECs with an LSP—for example, FECs A, B, and C. Intermediate LSRs may associate a subset of these FECs with the LSP—for example, A and B. The ingress router may in turn associate a further subset of the FECs with the LSP—for instance, just A. So, the egress router 130 associates an LSP with a set of FECs, and the ingress router 112 injects a subset of those FECs into the LSP, where the subset may be all or fewer than all of the FECs associated with the LSP by the egress LSR 112.

Label bindings for FECs can change over time as the network elements determine the current shortest path for specific FECs in the network and modify the connectivity accordingly. As labels are advertised, LSRs may remember the labels they receive regardless of whether they are using them or not ("liberal label retention"), or LSRs may prune the set of labels retained when compared with the routing database ("conservative label retention"). When using liberal label retention, when the routing protocol receives new information and computes a new view of the network, the best next hop for an FEC may change. When this happens, the LSR will check to see if it has retained a label for that FEC on the new best next hop and will configure itself to use the new label instead of the one it was previously using for the FEC. If an LSR has no label retained for a new next hop—which will frequently be the case when using conservative label retention—it may use downstream on demand label distribution to request one. Thus, LDP MPLS LSPs are transitory in nature.

In addition, MPLS allows two different modes of label distribution, known as "ordered" and "independent". In "ordered" mode, an LSR cannot advertise label bindings for an FEC until it has received FEC/label bindings from downstream peers. In "independent" mode, and LSR may advertise label bindings as soon as it has knowledge of an FEC—for instance, from a routing protocol. Such an LSR may advertise a label binding for FEC 'A' and a separate label binding for FEC 'B' before it receives an aggregated label binding for both FECs 'A' and 'B' from a downstream LSR.

To summarize, the attributes of the set of FECs associated with an LSP are:
  a number of FECs can be associated with an LSP. These are currently in the form of routing prefixes or host routes, but it is anticipated that they may also be in the form of class of service or quality of service forwarding policies, or any type of treatment that could be common to a group of packets.
  The number of FECs associated with an LSP may change over time.
  The number of FECs associated with an LSP can be added to, or subtracted from.
  An ingress may only choose to use an LSP for a subset of the advertised FECs associated with the LSP.
  FEC aggregation does not occur—that is, a more specific FEC prefix will not be subsumed by a more general FEC prefix at an intermediate node.
  When an LDP intermediate node receives an FEC advertisement for an LSP, it may choose only to advertise a portion of that list upstream as it may assume for some of the FECs, more optimal paths exist on different LSPs.

In any type of network, it is highly desirable to be able to test connectivity between an ingress point and an egress point. For MPLS networks, a standard known as ITU-T Y.1711, "OAM mechanism for MPLS networks", describes mechanisms for user-plane Operation and Maintenance (OAM) functionality for point-to-point (P2P) LSPs. One such mechanism is a Connectivity Verification (CV) probe. Use of the CV probe permits (amongst other things) misbranching (leakage) between ER-LSPs to be detected. Leakage of LDP-LSPs into ER-LSPs can also be detected but leakage of client LSPs (BGP VPN and PW LSPs) and leakage between LDP-LSPs cannot be detected. Misbranching can manifest itself in several forms. First of all, a label can be cross connected onto a label value that is not in use. Traffic containing such a label is discarded at the next LSR on the LSP, as there will be no incoming label map in the LIB for the packet. Secondly, a label can be cross connected onto a label that is being used. This will result in traffic being delivered to the wrong egress point in the network. Finally, an LSR can assign an incorrect FEC to a label at the ingress. This will result in traffic being delivered to the wrong egress point in the network.

Figure 10:
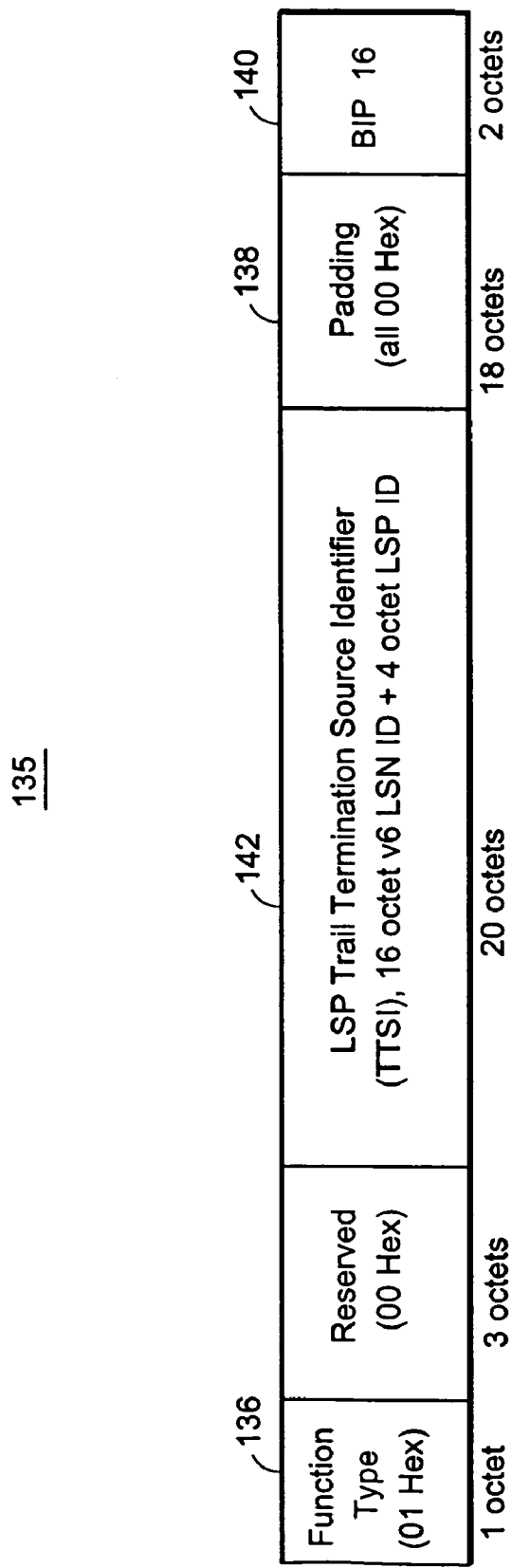
FIG. 10 is a representation of a connectivity verification message in accordance with ITU-T Y.1711.

The currently defined CV probe 135 is shown in FIG. 10. CV probes are transmitted periodically (e.g. 1/s), from an ingress LSR to an egress LSR. CV probes are one of several types of OAM messages identified by a pre-defined label value of 14. The payload of the packet with label value 14 contains the CV probe shown. The function type field 136 identifies various types of OAM packets, with '01 hex' identifying a CV packet. The padding field 138 is used to extend the packet to minimum required lengths for various network technologies, and the BIP 16 field 140 is an error detection field. Each CV packet carries a unique Trail Termination Source Identifier (TTSI) 142. The TTSI 142 is composed of the source LSR identifier, and an LSP identifier which serves to function as an access point identifier for the LSP. For ER-LSPs, the TTSI is established at LSP set-up time. As previously described, ER-LSPs are point-to-point, established between fixed interfaces at fixed end points, so that there is a 1-to-1 relationship between the LSP ingress and the LSP egress. Therefore, a CV probe flowing from the ingress to the egress that identifies the access point the ingress believes it is probing is normally sufficient to detect misbranching. When the egress LSR receives a probe with an unexpected TTSI value, it is able to flag the error to network management. For example, if an egress LSR receives CV probes with TTSI values that are unexpected, and receives no CV probes with TTSI values that are expected, then a misbranch error is indicated—that is, labels are cross-connected at some point along the LSP. If the egress LSR receives CV probes with TTSI values that are both expected and unexpected, a particular type of misbranch error known as a mismerge error is indicated—that is, one LSP's labels are being erroneously cross-connected onto another valid LSP. Thus, the currently defined CV probe is able to detect leakage between ER-LSPs, and from LDP-LSPs into ER-LSPs, since the TTSIs from LDP-LSPs will not match the expected TTSI.

However, the CV probe as currently defined cannot detect leakage between LDP-LSPs, stacked (client) LSPs into LDP-LSPs or from ER-LSPs into LDP-LSPs. This is because there is no fixed association between the ingress/egress points for an LDP-LSP that can be tested. As previously described, there is no explicit binding between LSP end points in an LDP-LSP; they may move over time, between LSRs or between interfaces on a single LSR. Furthermore, an ingress LSR may have a choice of multiple LSPs on multiple interfaces for a given FEC, and may choose to move the FEC to a different LSP. Connectivity between ingress and egress LSRs varies over time as the intermediate LSRs modify label bindings in response to changes in the resources available to the network. So, CV probes injected into an LDP-LSP will emerge at different interfaces and LSRs over time, yet the network is functioning correctly. The CV probe TTSI cannot therefore be relied upon to detect leakage between or from LDP-LSPs. However, it is highly desirable to be able to verify LDP-LSP connectivity, because there are numerous modes of failure that can undermine the correct operation of MPLS LDP-LSPs. In normal operation, FEC to label bindings flow via signaling from the egress towards the network ingress points. An LSR in the network will receive numerous FEC/LSP advertisements, may choose to remember any arbitrary subset, and at any given time selects the optimal LSP to use for an FEC on the basis of information received from other sources (e.g. the interior gateway routing protocol, IGP). Correct operation of the network depends on all LSRs having a synchronized view of the network to base their local MPLS configuration upon and the correct functioning of a significant amount of hardware and software both on and off the forwarding plane. This is a non-trivial system in operation, and adds a layer of complexity to the normal operation of IP networks as once routing convergence has completed, any MPLS re-configuration is still required. A mechanism to audit this behavior would be advantageous. Furthermore, unlike traditional IP networks, the formal decomposition of forwarding policies into FECs, and binding of FECs to paths, simplifies the function of overall verification of the forwarding system. In addition to the usual link and adjacency testing, simply verifying that the set of FECs associated with an LSP ingress corresponds to or is a subset of the set of FECs advertised by the LSP egress NE can catch all manner of misconfiguration, software, or hardware problems not detectable by other means.

In accordance with the principles of the present invention, a probe is provided to detect leakage between LDP-LSPs, and is distinguishable in some form from the probe used for ER-LSPs such that leakage from ER-LSPs into LDP-LSPs can be detected. Furthermore, other applications may be overlaid on the LDP network. These include pseudo wires, BGP VPNs, etc. and it is possible for these to leak into the LDP layer for any of a number of reasons, e.g. lack of synch between MPLS layers, failure to properly configure LDP on an interface etc. So the probe also detects misbranching between layers, as well as within the specific layer.

Figure 11:
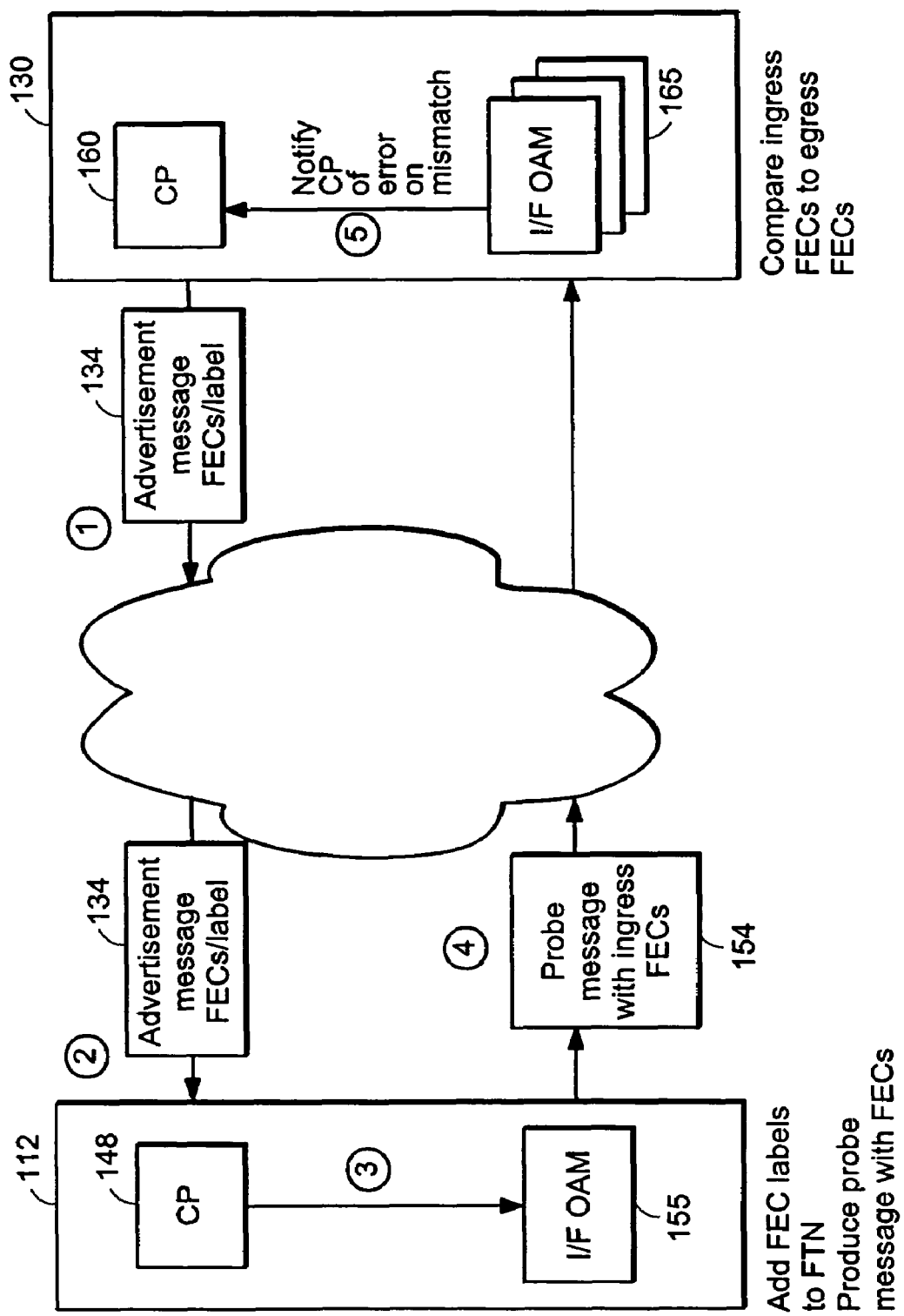
FIG. 11 is a schematic diagram of an MPLS network in which a probe message in accordance with the principles of the invention is used.
Figure 12:
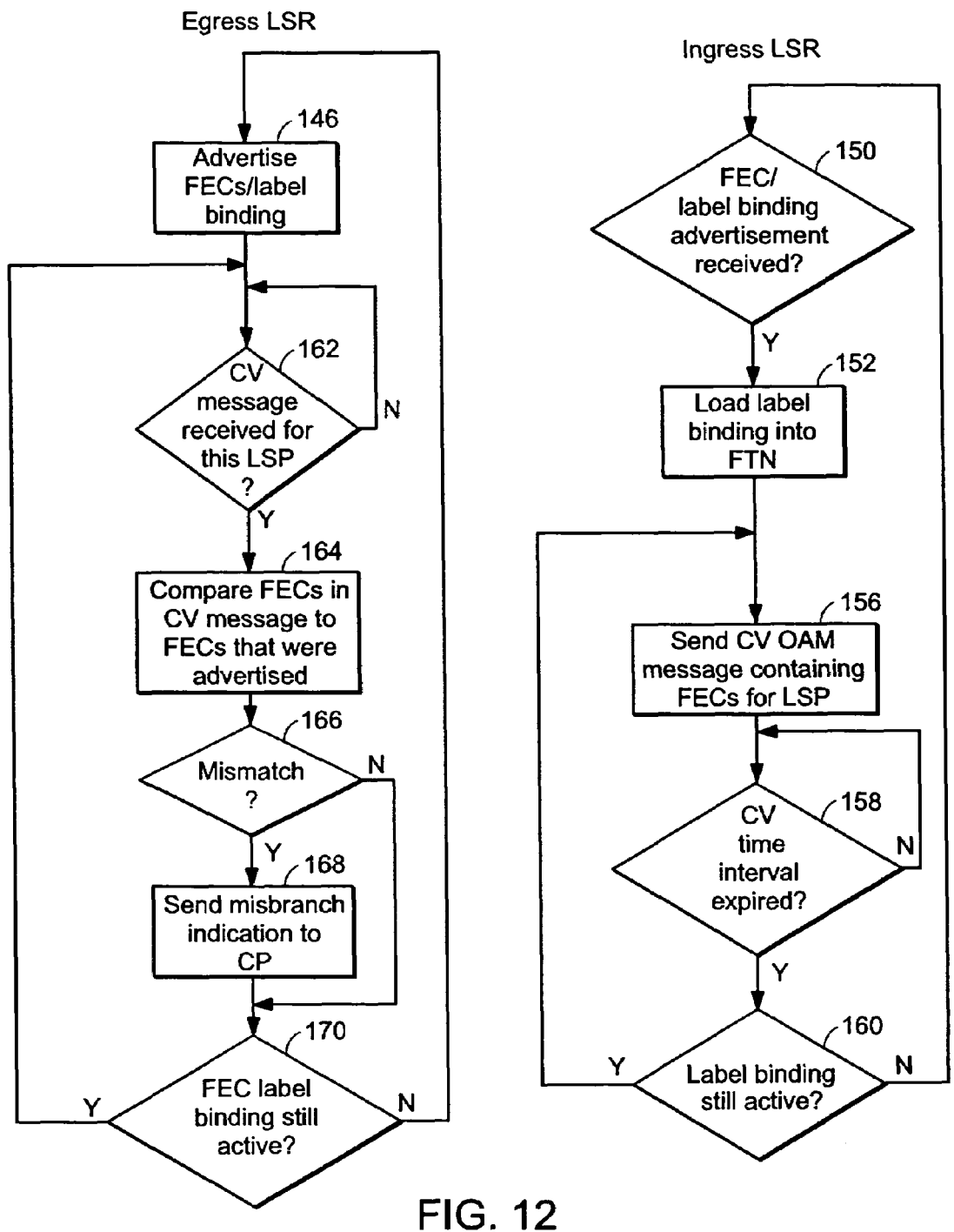
FIG. 12 shows a flow diagram of one example of the operation of the egress label switched router (LSR) of FIG. 11 and a flow diagram of one example of the operation of the ingress LSR of FIG. 11.

First, it is realized that, though the TTSI value of a CV probe does not represent a 1-to-1 binding between an ingress and egress LSR in an LDP-LSP, the set of FECs that represent the forwarding policy from the ingress to the egress is consistent over time. As previously described, the egress LSR will advertise labels for a set of FECs that it will forward. The advertisement is passed back through the network to the ingress LSR, which is assigned labels for all or a subset of the FECs that were advertised by the egress LSR. The ingress LSR examines incoming packets, and maps the packet destinations to the known set of FECs and thereby determines which LSPs to forward the packets upon. So, if the egress LSR has knowledge of the set of FECs being forwarded by ingress LSRs, then the egress LSR can verify that the correct label bindings are being used by the ingress LSRs by comparing the set of FECs the ingress believes it is injecting into the network to the set of FECs the egress advertised. Referring to FIGS. 11 and 12, a basic solution would be:

1) an egress LSR 130 sends an advertisement message 134 back towards the ingress LSR 112 (step 146). The advertisement message contains a set of FEC/label bindings.
2) A central processor (CP) 148 in the ingress LSR 112 receives an advertisement message 134 from the next hop LSR (step 150) and binds a subset of the advertised FECs to the label by entering the subset of FECs and the label into the FTN and NHLFE (step 152).
3) the ingress LSR 112 encodes in a probe message 154 the set of FECs that it knows about or chooses to use for the LSP just bound. The probe is sent from one of the OAM interfaces 155 on the ingress LSR 112 down the LSP to the egress LSR 130 (step 156). This set of FECs can be extracted from the LDP advertisement message, or from the FTN table. To provide ongoing verification, after a certain time interval, the ingress LSR 112 re-sends the probe message 154 (step 158). The ingress LSR 112 continues to periodically send the probe message 154 until the label binding expires (step 160). The label binding may expire, for example, because the ingress LSR 112 has chosen to use a different LSP for the FEC, in which case probe messages will continue to be periodically sent down the new LSP.

4) The egress LSR 130 receives the probe message 154 (step 162) on one of its OAM interfaces 165 and compares the set of FECs received in the probe 154 against the set of FECs it advertised for the LSP and identifies any mismatches (step 164, step 166, step 168). Any mismatch would indicate a misbranch error. If a mismatch is found, the egress LSR CP 60 is notified of an error (step 162). Various actions may be taken by network management functions in response to the error. Otherwise, the egress LSR 130 continues to monitor the probe messages (step 170).

Though functional, this solution involves parsing two FEC lists of arbitrary length and ordered arbitrarily, and comparing the sets of information tokens (i.e. individual FECs) contained in the lists to ensure that the ingress list is a perfect subset of the egress list. Each FEC is many bytes long. Such a comparison can be difficult to implement in hardware. An improved solution provides a simple means of encoding knowledge of the FECs associated with an LSP such that a simple mechanical comparison is possible to determine if the ingress believes there are FECs outside the subset advertised by the egress for the LSP. Ideally, a knowledge digest would produce a fixed length bit array encoding the set of FECs for the ingress and egress. Thus, no parsing would be required. Also, these bit arrays should be comparable to establish if the information encoded in one bit array is a subset of the information encoded in the other bit array. This is useful for determining if the set of FECs encoded in one probe message is a subset (i.e. all or fewer) of FECs advertised by the LSP egress. Simple Boolean operations comparing the bit array offered by the ingress with that programmed into the egress would identify if a mismatch exists in the sets of information represented. The processing of a knowledge digest with such properties can be easily implemented in hardware and can provide a highly scalable solution.

The knowledge digest may be advantageously implemented as a Bloom Filter, as previously described. The bloom filter can be applied as a simple means of representing a set of FECs. The egress LSR creates a filter representing the set of FECs it is advertising for an LSP. The ingress LSR creates a filter representing the set of FECs associated with an LSP and instantiated in the FTN. This should correspond to, or be a subset of, the set of FECs advertised by the egress for the termination of the LSP. Therefore all bits set in the ingress filter should also be set in the egress filter. When there is a mismatch, i.e. when there are bits set in the ingress filter that are not set in the egress filter, it is an authoritative indication that the ingress or an intermediate network element is misdirecting packets. Where there is no mismatch, there is only a very small statistical probability that the ingress is misdirecting packets.

Figure 13:
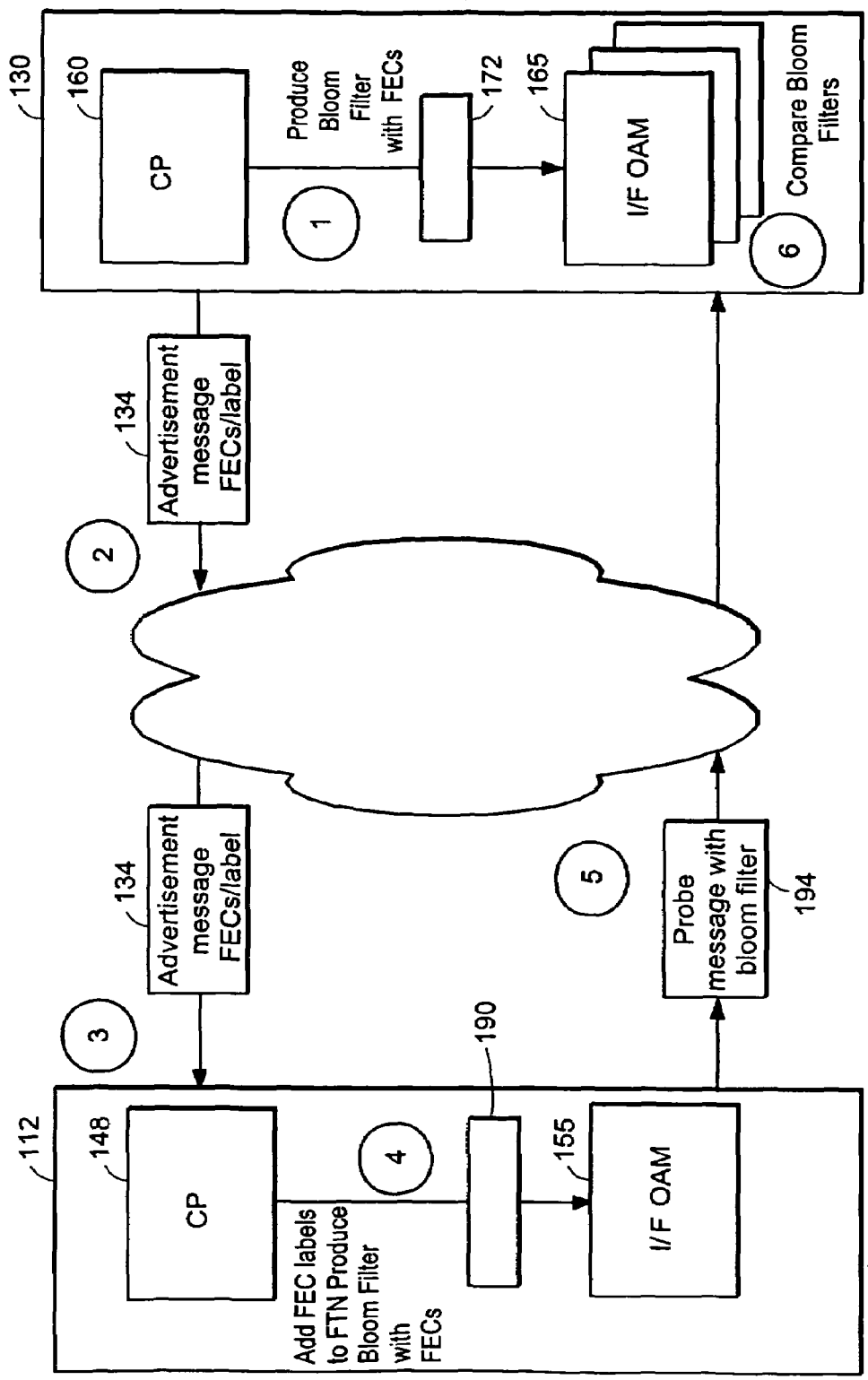
FIG. 13 is a schematic diagram of an MPLS network in which a probe message including a bloom filter in accordance with the principles of the invention is used.
Figure 14:
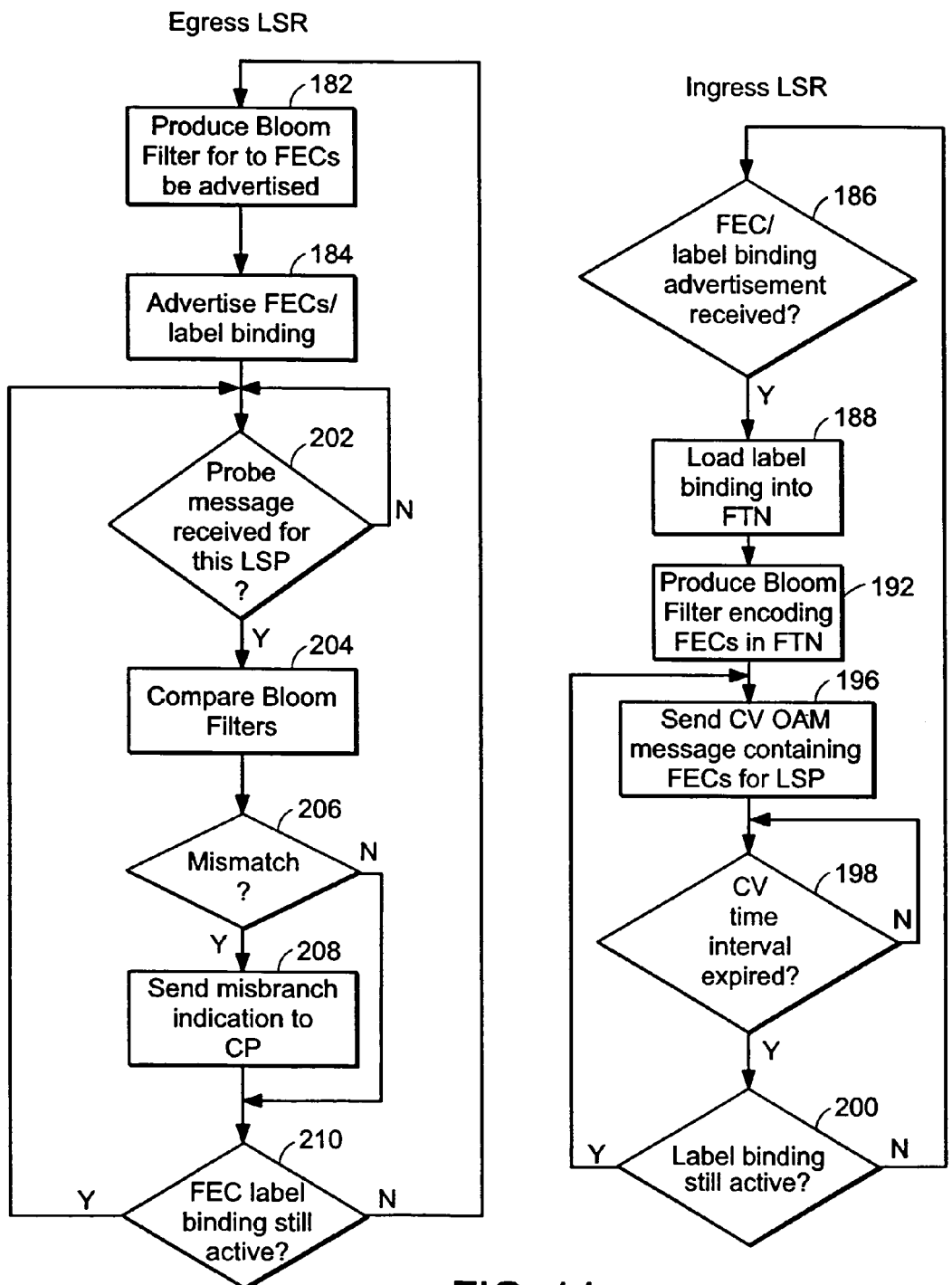
FIG. 14 shows a flow diagram for an example of the operation of the egress LSR of FIG. 13 and a flow diagram for an example of the operation of the ingress LSR of FIG. 13.

More particularly, referring to FIGS. 13 and 14, the bloom filter is applied as follows:

1) Upon receipt of a label request or prior to receiving an unsolicited binding, the egress LSR 130 encodes the set of FECs it is offering for an LSP into a bloom filter 172 (FIG. 14 steps 180, 182). The OAM module 165 on the interface the LSP is offered upon is programmed with the filter value.

2) The egress LSR 130 sends an LDP Advertisement message 134 containing the FEC/label bindings to its peers (step 184).

3) At some point later, the ingress LSR 112 receives an LDP advertisement of an FEC/LSP binding. The ingress LSR 112 loads the label bindings corresponding to the shortest path as determined by the routing system into its FTN (steps 186, 188).

4) The ingress LSR 112, using the same encoding procedure as was used by the egress LSR 130, encodes the set of FECs it is using for that LSP as a bloom filter 190 (step 192). The ingress may use the set of FECs received in the LDP advertisement, or it may extract the set of FECs from the FTN/NHLFE for the outgoing label.

5) The ingress LSR 112 sends a probe message 194 containing the bloom filter 190 to the egress LSR 130 by injecting the probe message 194 into the LSP (step 196). The ingress LSR 112 continues to send the probe messages 194 at pre-determined intervals as long as the ingress LSR 112 uses the current label binding for the FEC (steps 196, 198, 200).

6) The OAM interface 165 on the egress LSR 130 receives the probe message 194 and extracts the filter (step 202). It compares the filters by logically 'AND'ing the inverse of the filter programmed into the egress LSR with the filter received from the ingress LSR (step 204). If a non-zero value results (step 206), then the FECs being injected onto the LSP by the ingress LSR 112 are not a subset of the FECs being received on the LSP by the egress LSR 130, and the OAM interface 165 sends a misbranch indication to the CP 160. If a 0 value results, then the FECs being injected onto the LSP by the ingress LSR 112 are a subset of the FECs being received on the LSP by the egress LSR 130, and the network is operating correctly. The egress LSR 130 will continue to monitor the probe messages 94 and perform the misbranching (step 210).

One special case for consideration relates to deletion of an FEC from an LSP. Under certain circumstances, an LSR may remove an FEC from the set of FECs associated with an LSP. This information will take a variable length of time to propagate across the network. If the LSR immediately modifies the bloom filter associated with the LSP in the OAM module, then false mismatches will occur until the network view of the FECs associated with the LSP is synchronized. This can be addressed in a number of ways. Assuming the egress LSR 130 is removing an FEC from an FEC/LSP binding, it may do any of the following (but is not restricted to these particular solutions):

1) The egress LSR 130 removing the FEC/LSP binding waits some reasonable length of time before modifying the OAM module 165 with the new filter value.

Figure 15:
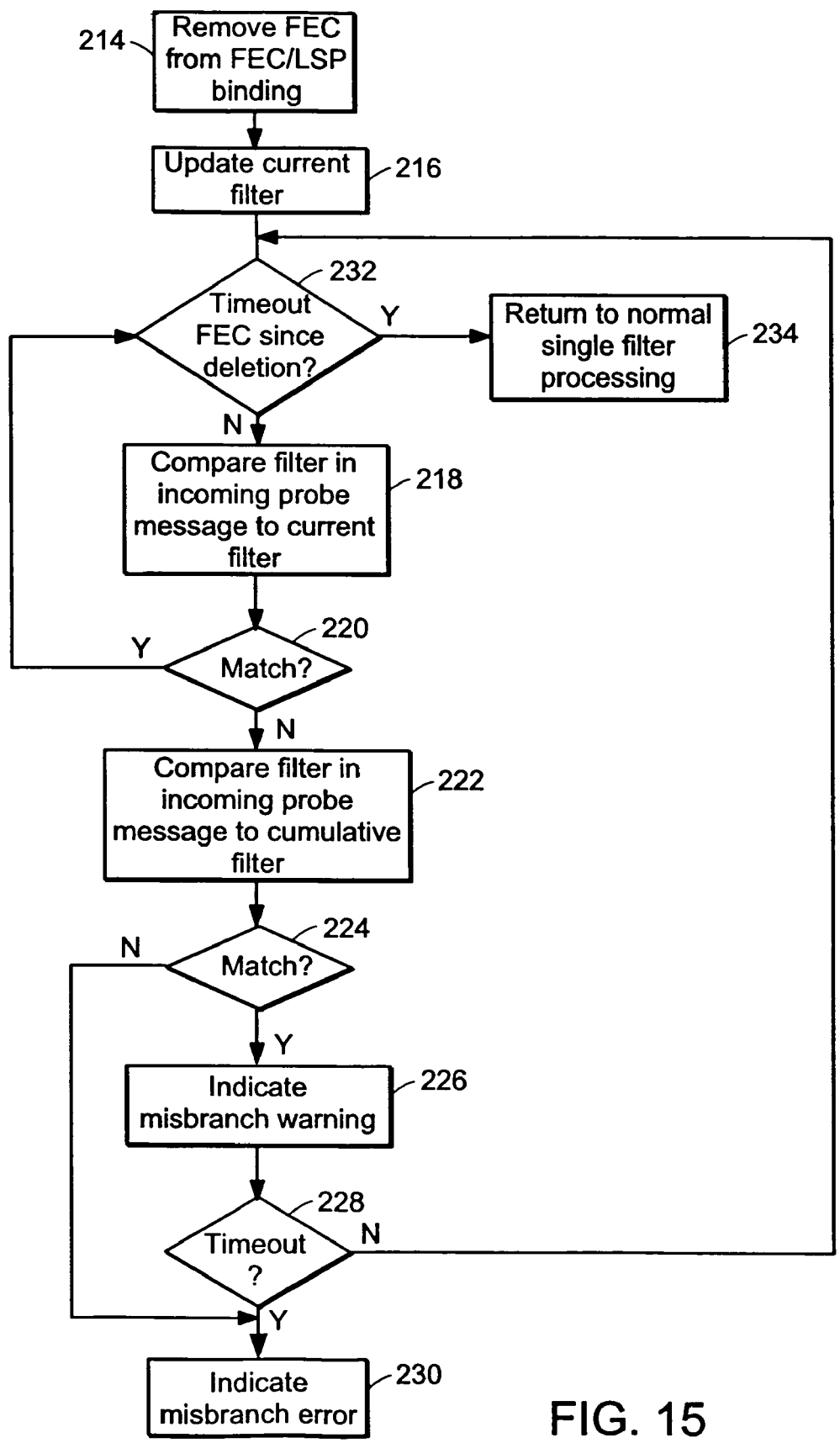
FIG. 15 is a flow diagram showing the operation of the egress LSR when an FEC is deleted from the group of FECs associated with a label switched path (LSP).

2) Referring to FIG. 15, the OAM module 165 contains two filters, one being the current set of FECs advertised for the label, and the other being the cumulative set ever offered for the label. The egress LSR 130 deletes an FEC from an FEC/LSP binding (step 214). The current filter is updated to reflect the new set of FECs (step 216). The filter in an incoming probe message 194 is compared to the current filter (step 218). If there is a mismatch (step 220), indicating that the set of FECs being received from the ingress LSR 112 is not a subset of the set of FECs currently being advertised by the egress LSR 130, then the filter in the incoming probe message 194 is compared to the cumulative filter (step 222). If the filter in the incoming probe message 194 matches the cumulative filter while mismatching the current filter (step 224), then this may indicate that the FEC/LSP bindings have not yet converged, so a warning is generated, not an error (step 226). A timestamp can be associated with the last change such that past a certain length of time (step 228), the warning becomes an error (step 230), indicating that the network has failed to synchronize. If the filter in the incoming probe message 194 does not match either the current or cumulative filter, then a misbranching error is indicated. Some period of time after the FEC/LSP label bindings were changed (step 232), the egress LSR 130 returns to normal single filter processing as previously described (step 234).

Figure 16:
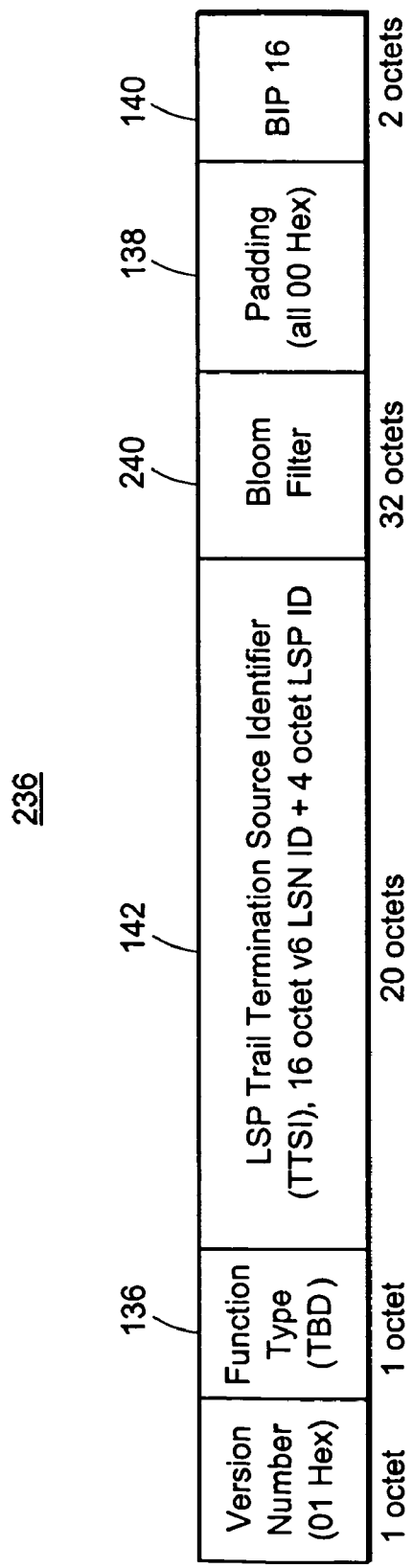
FIG. 16 is a representation of a new connectivity verification probe and stop connectivity verification message in accordance with the principles of the invention.

There are many different sorts of protocol probe messages that could be used to transport the knowledge digest from ingress to egress in accordance with the principles of the invention. In one particular implementation, the probe message 94 is adapted for use with the ITU_T Y.1711 OAM standard. The probe message may be implemented as a new type of OAM message. Or, the Y.1711 CV messaging may be modified such that LDP-LSP misbranching detection is possible. As previously described, current implementations of Y.1711 discard CV messages at LDP terminations. At ER terminations, only the TTSI is checked. Referring to FIG. 16, there is shown an example of two variations of the ITU_T Y.1711 CV probe message 236 in accordance with the invention, known as the FEC-CV probe message and the stop FEC-CV message. The function type field 136 encodes one of two new types of messages, the FEC-CV type message, or the stop FEC-CV message. The format of the stop FEC-CV message is the same as that of the FEC-CV probe except for a different function type value. In both the FEC-CV probe and the stop FEC-CV message a filter field 240 has been added for storing the bloom filter.

Figure 17:
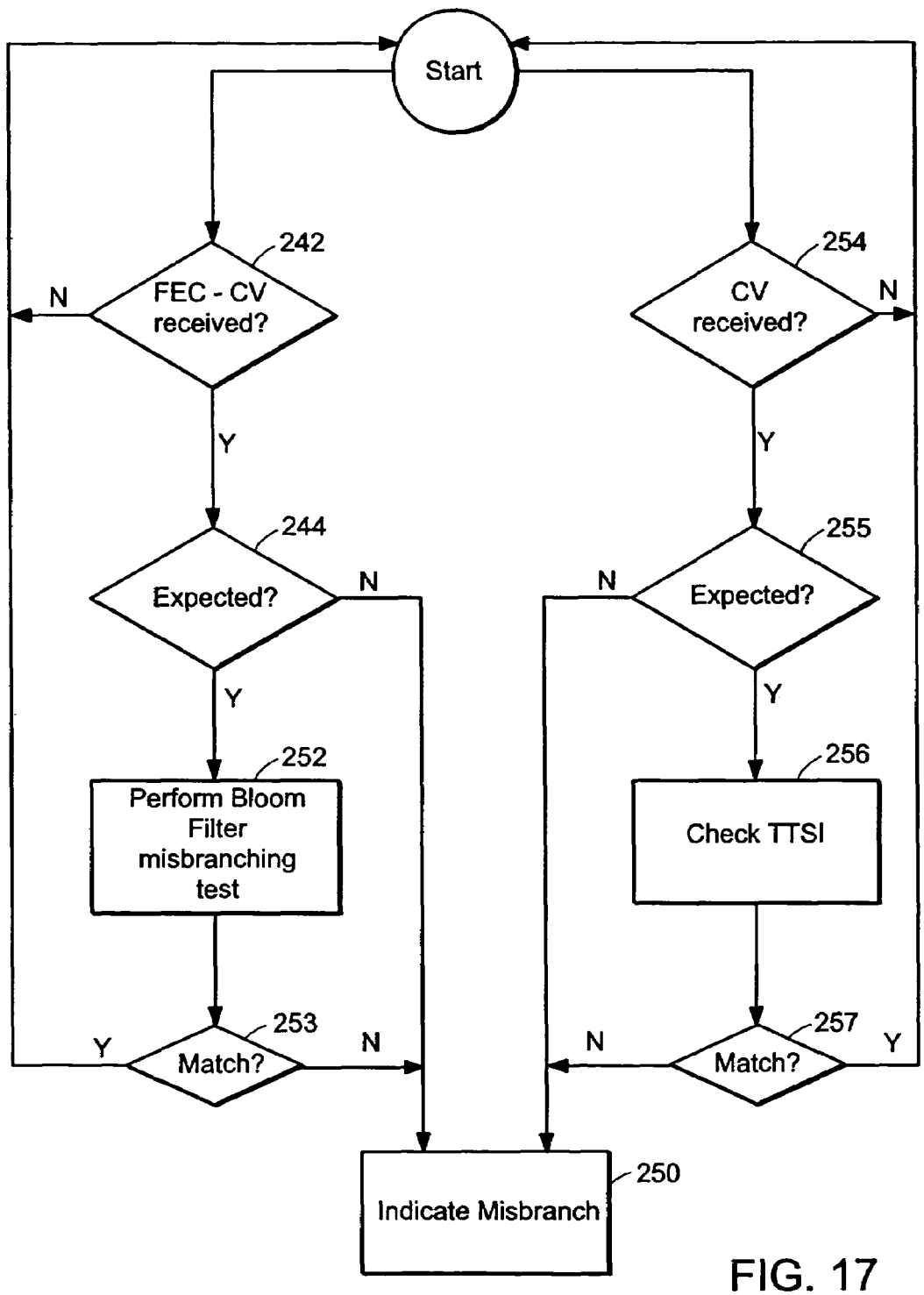
FIG. 17 is a flow diagram showing how the connectivity verification probe of FIG. 11 is used in accordance with ITU-T Y.1711 as modified to implement the invention.

Referring to FIG. 17, CV messages are then handled as follows:

1) If the CV message 236 arrives at an LDP-LSP termination (egress LSR 130), (step 242) and the function type field 136 indicates that it is not an FEC-CV probe message (step 244), i.e. the message is of an unexpected type, then misbranching from an ER-LSP (or other LSP type using CV) into an LDP-LSP is occurring (step 250).
2) If the CV message arrives at an LDP-LSP termination and the function type field 136 indicates that it is an FEC-CV probe message (step 244), then perform the previously described misbranching test (step 252, 253). If the misbranching test fails, then indicate a misbranch (step 250).
3) If the CV message arrives at an ER-LSP termination (step 254), and the function type field 136 indicates that is not a traditional CV probe message (step 255), i.e. the message is of an unexpected type, then misbranching from an LDP-LSP into an ER-LSP is occurring (step 250).
4) If the CV message arrives at an ER-LSP termination and the function type field 136 indicates that is a traditional CV probe message (step 255), then check the TTSI (step 256). If the TTSI is not a match (step 257), then indicate a misbranch (step 250).

Note that in the above descriptions, the probe message travels from the ingress to the egress LSR. If PHP is enabled, it should be understood that misbranching can then only be detected by the PHP LSR, since the probe message will terminate there. There are other mechanisms that may permit other than the egress or PHP LSR to detect misbranching such as packet time-to-live (TTL) manipulation. The stop FEC-CV message also travels from ingress to egress LSR. Upon choosing to withdraw a label, the ingress stops inserting FEC-CV probes into the LSP, and inserts some predetermined number, for example three, of stop FEC-CV messages into the LSP at the same interval previously used to insert FEC-CV probes.

The processing of the stop FEC-CV message at the egress is described below with reference to FIGS. 26 and 27.

The principles of the invention can also be applied to test for proper operation in a load-sharing tunnel environment. Again, the invention can be applied to all types of MPLS tunnels, regardless of the method of label distribution. For purposes of example, the application of the invention to load-sharing LDP-LSP tunnels is now described.

One method of load sharing used in MPLS networks is known as Equal Cost Multipath (ECMP). As implemented in MPLS, an intermediate LSR when encountering a selection of outgoing paths to the same destination of equal cost may choose to inverse multiplex the traffic destined to the destination over the set of paths. However, flow ordering of the IP payloads must be preserved. This is done in some implementations by incorporating the IP source and destination addresses into the path selection algorithm such that any given source-destination pair resolves to the same path.

If a misbranching fault occurs on a set of ECMP MPLS LSPs, then the network will appear to misbehave for only an apparently random subset of packets originating from any point upstream of the fault. Thus, one can expend unnecessary time and effort as they cannot diagnose the fault from any arbitrary upstream point in the LSP. So, in accordance with a further aspect of the invention, connectivity probes are provided that allow the identification of the upstream LSR closest to the point of failure as possible.

Figure 18:
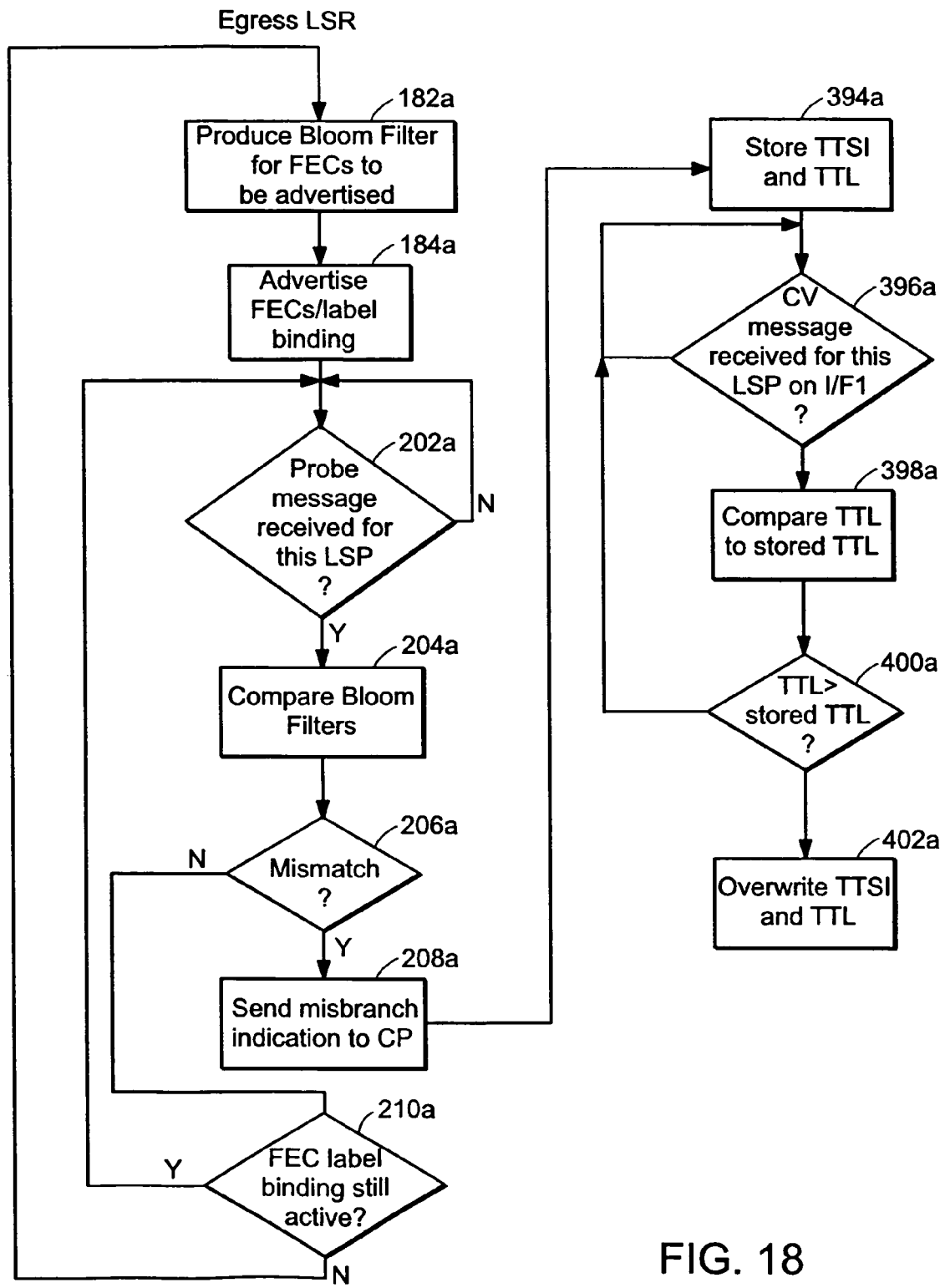
FIG. 18 is a flow diagram showing how connectivity measurement can be further refined to identify a network element closest to the point of a misbranching fault.
Figure 19:
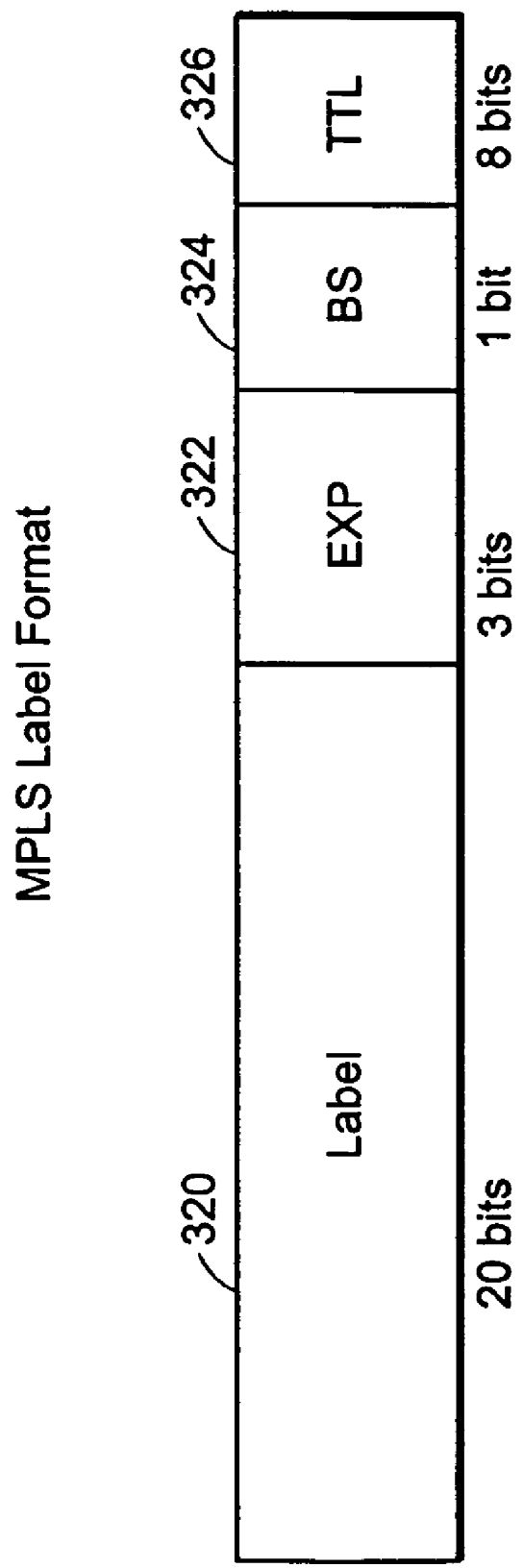
FIG. 19 is a representation of the MPLS generic label format.

Referring now to FIG. 18, there is shown the process of FIG. 14 as modified to identify the upstream LSR closest to the point of failure as possible. Like steps to xx of FIG. 14 are labeled xxa in FIG. 18. Recall from FIG. 16 that an FEC-CV probe message includes the TTSI field 142, which includes an LSR-ID of the LSR sending the probe. In addition, referring to FIG. 19, the generic MPLS label format is shown. Included is the label field 320, an EXP field 322 that can be used for traffic engineering purposes, and a BS field 324 that indicates as to whether a label is at the bottom of a label stack. Also included is a time-to-live (TTL) field 326, which indicates the number of hops the probe has taken, or in other words indicates the number of LSRs the probe has traversed. In the following, TTL fields are extracted from the label stacked on top of the FEC-CV probe message.

At step 206a, when the bloom filter for the incoming probe is compared against the egress LSR bloom filter and a mismatch is found, then the TTSI from the FEC-CV probe message is saved, and the TTL is extracted from the next label in the stack and is also saved. (step 394a). For subsequently received FEC-CV probe messages (step 396a), the TTL is compared to the prior saved TTL (step 398a). If the newly received TTL is larger than the prior saved TTL (step 400a), indicating that the newly received FEC-CV probe traveled a shorter distance and is therefore was issued from an LSR that is closer to the misbranching fault than the LSR that issued the prior probe, then the prior saved TTSI is overwritten with the newly received TTSI (step 402a) and the prior saved TTL replaced with the newly received TTL. After a period of time, the saved TTSI will contain the LSR-ID of the LSR closest to the misbranching fault.

Now that connectivity can be tested, further applications become feasible. For example, tunnel connectivity can be measured. In accordance with the principles of the invention, tunnel connectivity can be measured across MPLS tunnels regardless of the type of label assignments being used. The example herein presented applies tunnel connectivity measurement to LDP-LSP tunnels. As previously described, LDP-LSPs can move between LSRs or between different interfaces on an LSR as routing changes over time. Numerous ingress LSRs can be sending packets to the same FEC on multiple interfaces. Thus, an egress LSR may receive a series of probe messages containing a filter encoding certain FECs on several interfaces. But, each interface will receive the FEC from a unique ingress LSR. When the LSP moves, the egress LSR will no longer receive the probe messages for a particular FEC/ingress LSR combination on one interface, but may start receiving the same probe messages on another interface. If the egress LSR is capable of recognizing that the probe messages are in fact still arriving, then the egress LSR can verify LDP-LSP connectivity.

Figure 20:
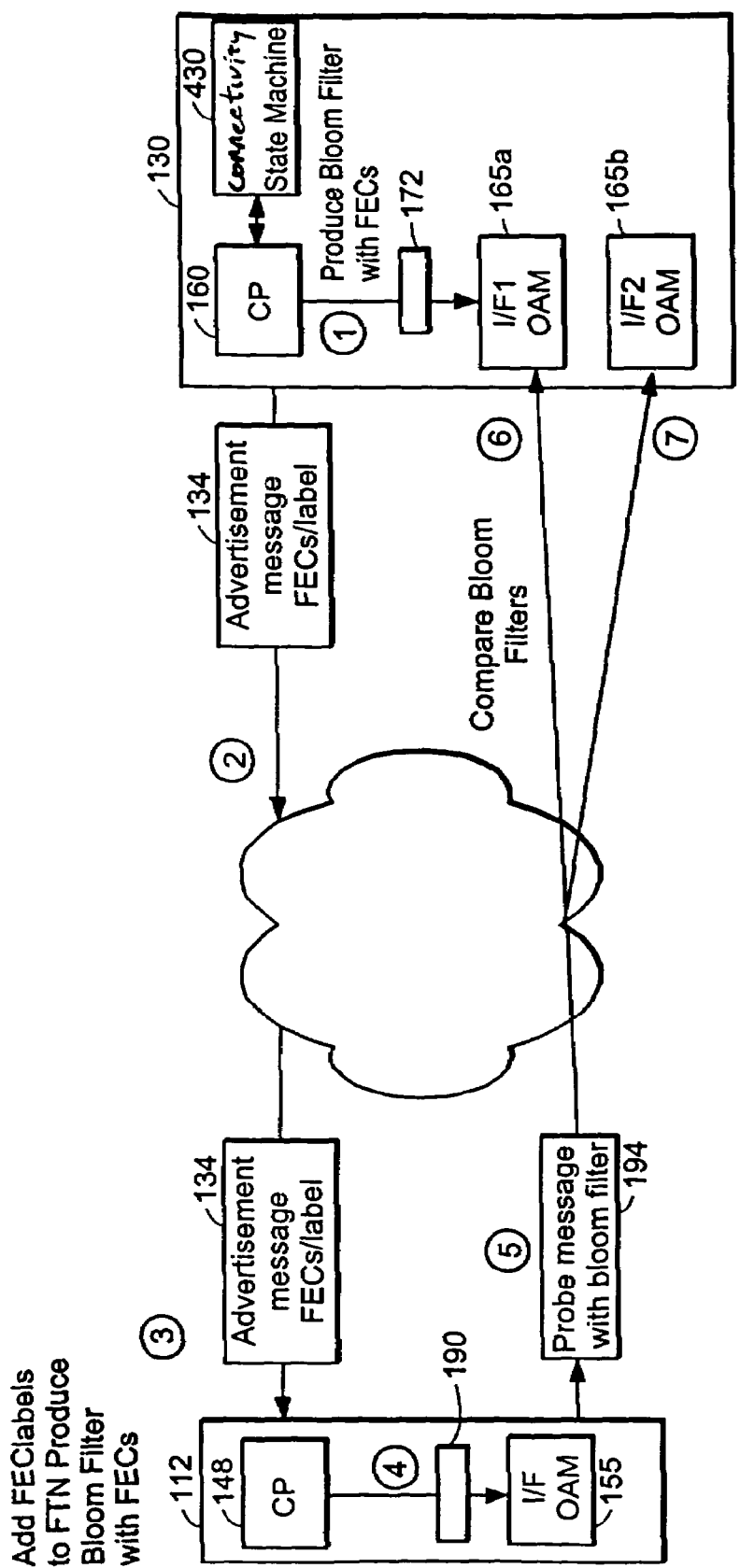
FIG. 20 is a schematic diagram of an MPLS network in which a probe message in accordance with the principles of the invention is used to track LSP connectivity.
Figure 21B:
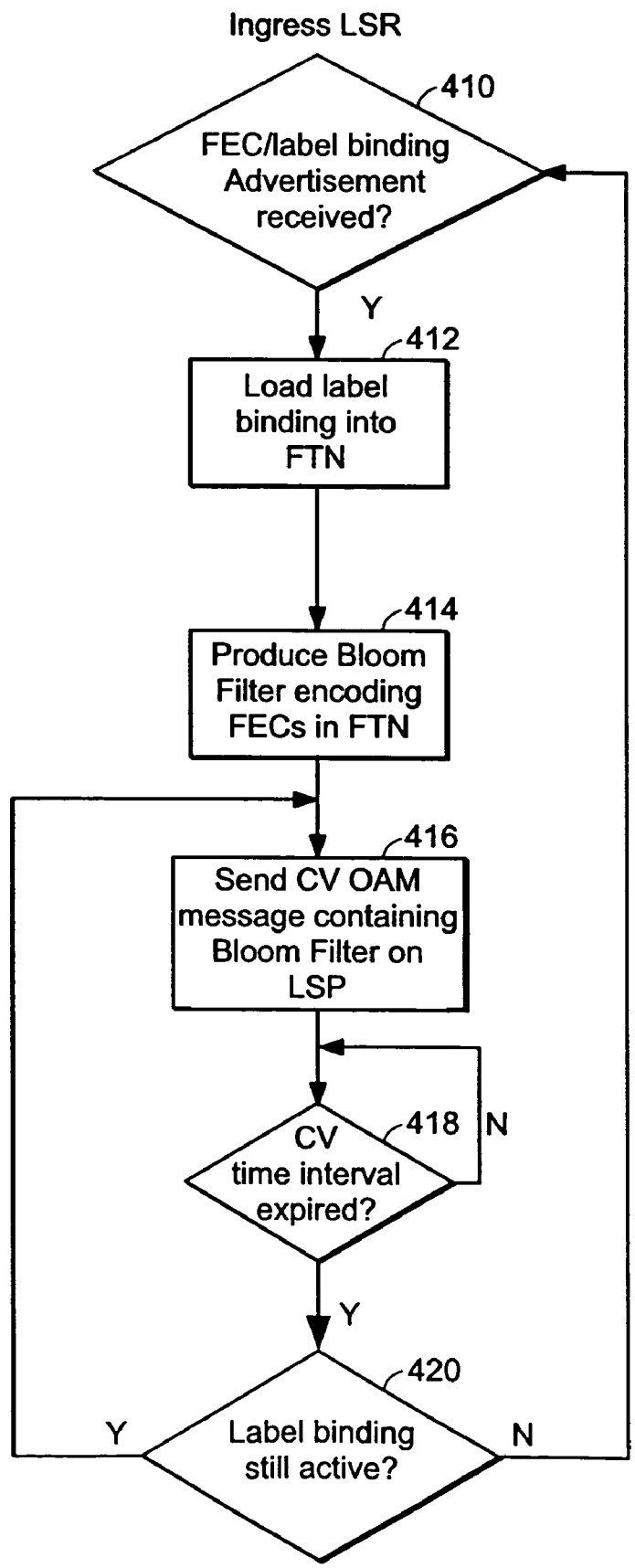
FIG. 21 shows flow diagrams representing the operation of two of the OAM interfaces on the egress LSR of FIG. 20, and the operation of the ingress LSR of FIG. 20.

Referring now to FIGS. 20 and 21, there is shown an MPLS network 110 in which the egress LSR is capable of tracking LDP-LSP connectivity. In FIG. 21A two flow diagrams are shown. Each OAM interface 165a and 165b execute the same algorithm, the steps of which are labeled with like reference numbers followed by 'a' and 'b' respectively. Connectivity is evaluated as follows:

1) Upon receipt of a label request, the egress LSR 130 encodes the set of FECs it is offering for an LSP into a bloom filter 172 (FIG. 21 steps 404, 406). All OAM interfaces on the egress LSR 130 are programmed with the filter value. As herein shown, the OAM interfaces 165a and 165b are programmed with the filter value.

2) The egress LSR 130 sends an Advertisement message 134 containing the FEC/label bindings to the ingress LSR 112 (step 408).

3) At some point later, the ingress LSR 112 receives an LDP advertisement of an FEC/LSP binding. The ingress LSR 112 checks that the LDP advertisement corresponds to the shortest path for the FEC via consulting the routing system and if so, loads the label bindings into its FTN (steps 410, 412).

4) The ingress LSR 112 encodes the set of FECs it is using for that LSP as a bloom filter 190 (step 414). The ingress may use the set of FECs received in the LDP advertisement, or it may extract the set of FECs from the FTN/NHLFE for the outgoing label.

5) The ingress LSR 112 sends a probe message 194 containing the bloom filter 190 and its LSR-ID (FIG. 12) to the egress LSR 30 by injecting the probe message 194 into the LSP (step 416). The ingress LSR 112 continues to send the probe messages 94 at pre-determined intervals. (steps 416, 418, 420).

6) The egress LSR 130 receives the probe message 194 at the OAM interface 165a and extracts the filter (step 422). The previously described misbranching test is performed (steps 424, 426). If the misbranching test determines that the network is operating correctly, and the interface 156a has not seen the combination of FEC and LSR-ID before, then the OAM interface 156a notifies the CP 60 of connectivity for the FEC/ingress LSR combination at the interface 156a (step 428a). The CP 160 starts the connectivity state machine 430. The egress LSR 130 continues to monitor the receipt of probe messages at the proper intervals (step 432a). If the FEC/LSR-ID combination has previously been recognized, then the interface 156a continues to listen for probe messages containing this combination.

7) A routing change causes a shift of traffic from the OAM interface 156a to the OAM interface 156b.

8) The OAM interface 156a stops receiving the probe messages 194. After a predetermined interval during which no probe messages 194 are received, the OAM interface 156a notifies the CP 160 that the ingress LSR is no loner connected for the FEC on the interface 156a (step 434a). The connectivity state machine 430 is so notified.

9) Meanwhile, the FEC/ingress LSR combination has become connected on another interface 156b. The OAM interface 156b begins receiving the probe messages 194 for the FEC/ingress LSR combination (step 436b). After performing the misbranching test and determining that the FECs are a subset of previously programmed FECs (steps 422, 424, 426), the OAM interface 156b notifies the CP 160 that the FECs are connected from the ingress LSR on the interface 156b (step 428b). The connectivity state machine 430 is so notified.

10) The connectivity state machine 430 correlates the loss of connectivity of the FEC/LSR-ID combination on the OAM interface 156a to the connectivity of the same FEC/LSR-ID combination on the OAM interface 156b, and thus can indicate that no outage has occurred and the LSP is continuously connected. This information can be used by higher level applications that manage SLAs.

Thus, insertion of FEC-CV probes is dependent on the availability of a route for the FEC. If no route is available, then connectivity does not exist, and an additional step beyond shifting between interfaces in response to routing changes is performed. This additional step consists of terminating FEC-CV generation in the event that the route associated with the FEC is withdrawn. Accordingly, the disclosed system measures connectivity across the network in two terms, absolute availability of a path, and absolute availability of a route.

Figure 22:
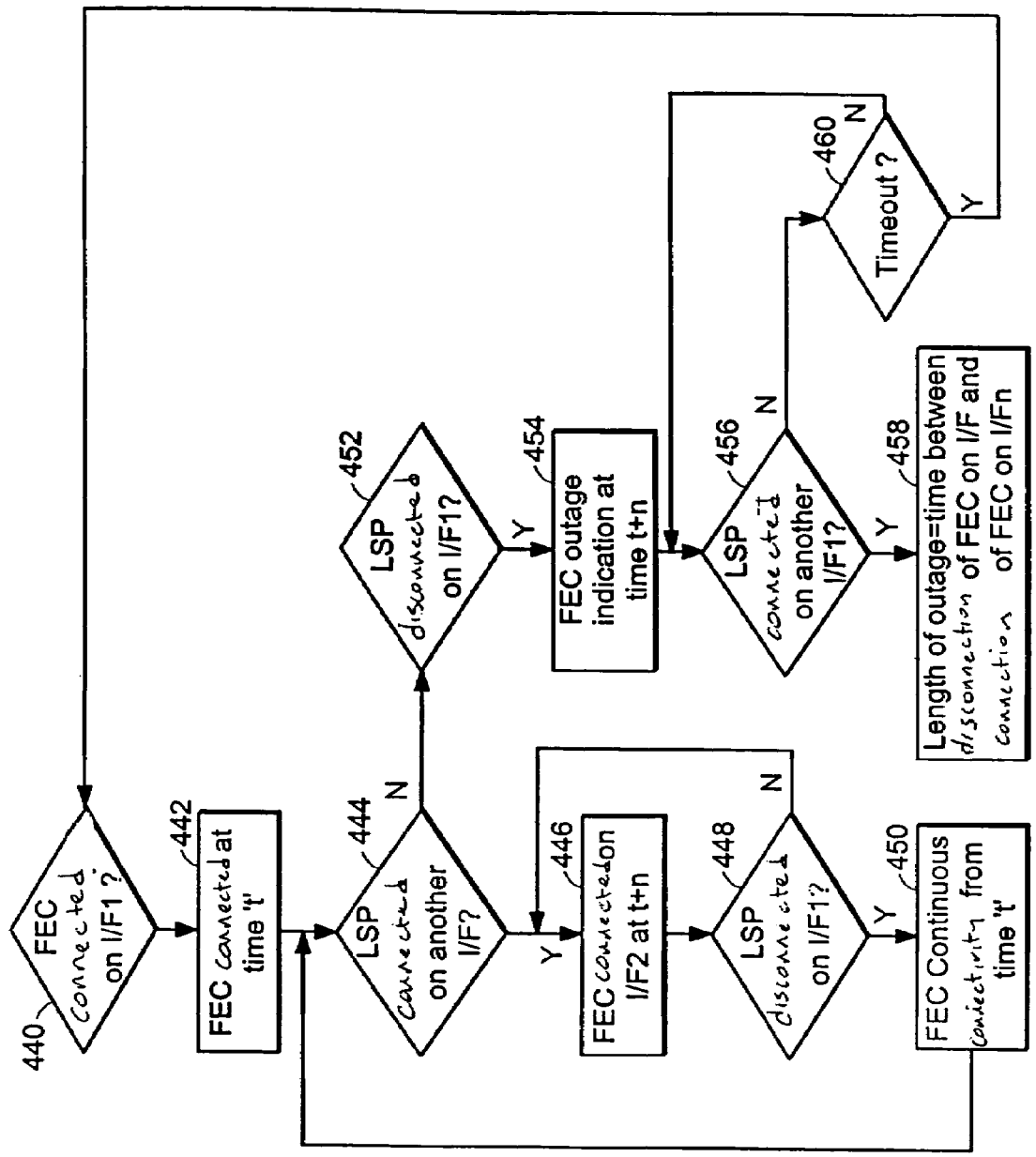
FIG. 22 is a flow diagram representing the operation of the connectivity state machine of FIG. 20.

In accordance with a preferred implementation, the probe messages 194 are FEC-CV messages as shown in FIG. 16, and the ingress and egress LSRs 112 and 130 operate in accordance with ITU-T Y.1711 as modified herein. As a further example, in accordance with ITU-T Y.1711 defect criteria, defect free operation is defined as receiving two consecutive probe messages for an LSP. Also in accordance with Y.1711, CV messages are issued once per second. FIG. 22 shows how the connectivity state machine 430 would operate if these criteria are used:

An FEC/ingress LSR combination is connected on a first OAM interface 156a on the egress LSR 130 connectivity state machine 430 keeps track of the time 't' that the FEC became connected (steps 440, 442). The FEC/ingress LSR combination switches to a second OAM interface 156b on the egress LSR 30.

The connectivity state machine 430 notes that the OAM interface 156b declares the FEC/ingress LSR combination to be connected at time 't'+2 seconds (steps 444, 446).

The connectivity state machine 430 notes that the OAM interface 156a declares the FEC/ingress LSR combination disconnected at time 't'+3 seconds (step 448).

In these circumstances, the connectivity state machine 430 is able to determine that the FEC/ingress LSR combination actually was continuously connected, since the FEC/ingress LSR combination became connected on a second interface before it was detected as disconnected on the first interface (step 450.)

Another scenario would be:

An FEC/ingress LSR combination is connected on a first OAM interface 156a on the egress LSR 30 (steps 440, 442) at time 't'.

Probe messages 194 for the FEC/ingress LSR combination stop appearing at the OAM interface 156a (step 452). The FEC has not appeared on any other interface (step 444).

The connectivity state machine 430 notes that the OAM interface 156a declares the FEC/ingress LSR combination disconnected at time 't'+3 seconds (step 454).

The FEC/ingress LSR combination appears on the OAM interface 156b at time 't'+5 seconds.

The connectivity state machine notes that the OAM interface 56b declares the FEC/ingress LSR combination connected at time 't'+7 seconds (step 456).

In this case the connectivity state machine 430 is able to correlate the notification times to determine that an outage occurred at time 't' and lasted for 5 seconds (step 458). If the FEC/ingress LSR combination never appears on another interface, the connectivity state machine will timeout (step 460).

Figure 23:
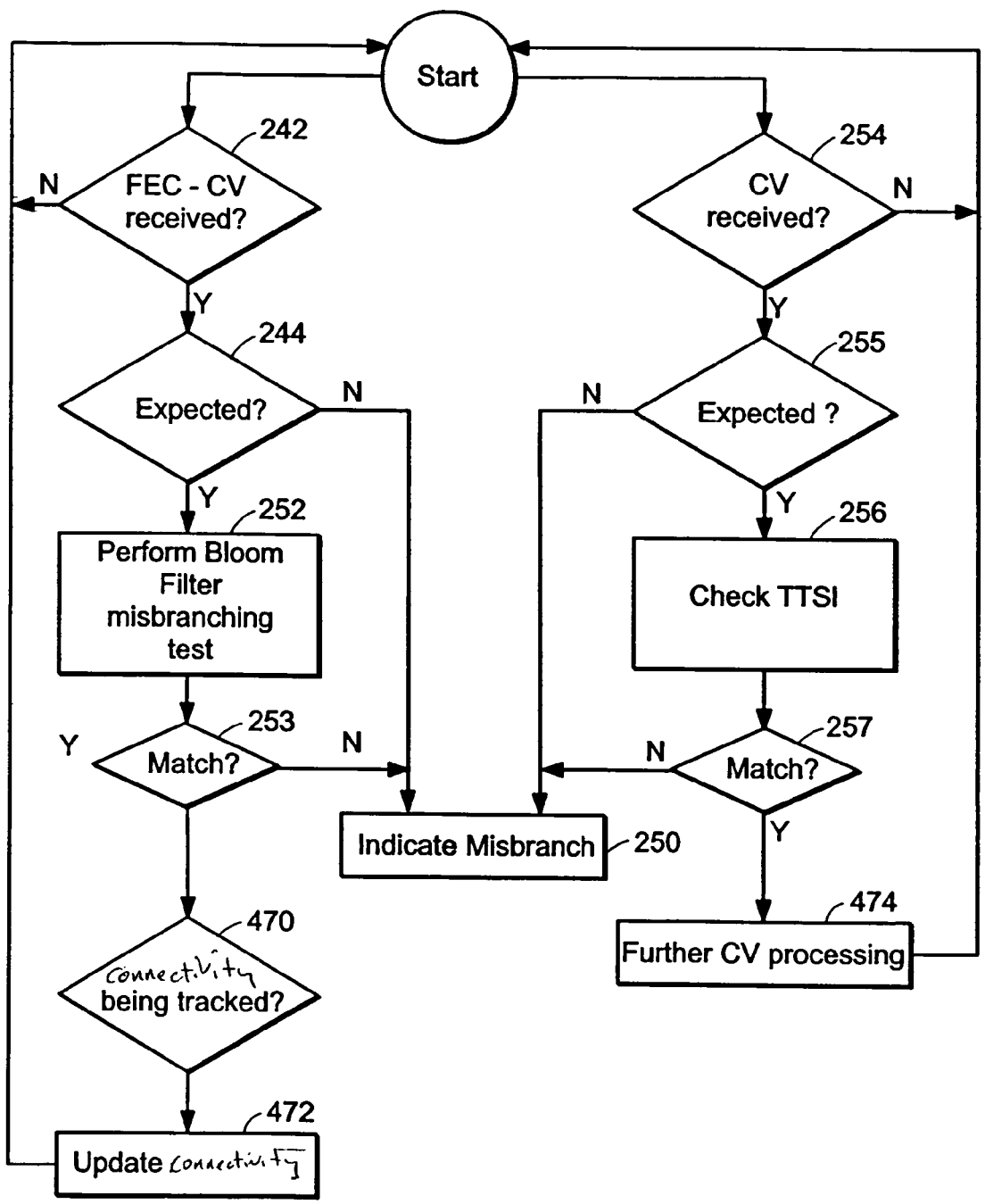
FIG. 23 is a flow diagram showing how the process of FIG. 17 is modified to include connectivity measurement.

In FIG. 23 there is shown the CV message handling of FIG. 17, modified to allow connectivity testing. If a CV message arrives at an interface (step 242), and the message is associated with an LDP-LSP (step 244), and the type field indicates that this is an FEC-CV message (step 242), then the misbranching test is performed as previously described (step 252, 253). After the misbranching test, then if connectivity is being tracked (step 470), then connectivity status is updated (step 472) in accordance with the mechanisms described in FIGS. 20-22. For non-LDP LSPs, further CV processing to test connectivity can be performed in known manners (step 474).

LDP-LSP connectivity measurement has particular application where the egress LSR has advertised itself as an FEC. This occurs for example in known RFC 2547 IP-VPNs, many layer 2 VPN applications, and applications that eliminate BGP in the core. In all these cases, it is highly advantageous for the egress LSR to be able to track the other edge LSRs that are communicating with it. In addition, the LDP-LSP connectivity measurement is advantageous in that it is automated and does not require configuration. The egress LSR simply starts tracking ingress LSRs that are communicating with it, and provides an automatic indication when one of the ingress LSRs stops communicating.

Note that the user network element, for example the ingress LSR, frequently does not know who the originating node is for a FEC advertisement and the egress node may not be aware of the set of ingresses that will use the FEC advertisement. Therefore, by sending the probe messages, the ingress node effectively registers for connectivity measurement with an unknown originator/egress node and binds it's identity via the bloom filter representation of the FEC in such a way that the egress can verify correct connectivity and configuration. This is contrasted with known connectivity measurement techniques in which both nodes must be configured with explicit knowledge of each other. Provisioning steps are advantageously reduced when setting up the network. The egress node turns on, advertises FECs, starts receiving probes and performs connectivity measurement on those it receives. Furthermore, the connectivity testing mechanism herein described can be used to probe application specifics including availability of specific routes in the network (and as such is a simultaneous audit of connectivity and the routing system), whereas many other techniques can only test reachability of the egress node. For operational completeness, it should be noted that it is possible for a node to deregister from connectivity measurement via the stop-FEC-CV PDU. This requirement is a normal artifact of adds, moves and changes in the network. The procedures are identical to that of the alternate embodiment of connectivity tracking outlined later in the document.

The LDP-LSP connectivity measurement techniques as herein described are highly advantageous in that probe processing takes place at the egress LSR interfaces, and the central processing functions need only correlate the connectivity results received from the interfaces. This solution is more scalable than solutions wherein all connectivity processing is performed by a central processing function. In addition, whereas connectivity of IP networks and availability of routes with respect to time was heretofore impossible, the connectivity and route availability of IP networks on MPLS can now be measured.

2. RFC 2547 BGP VPN

Figure 24:
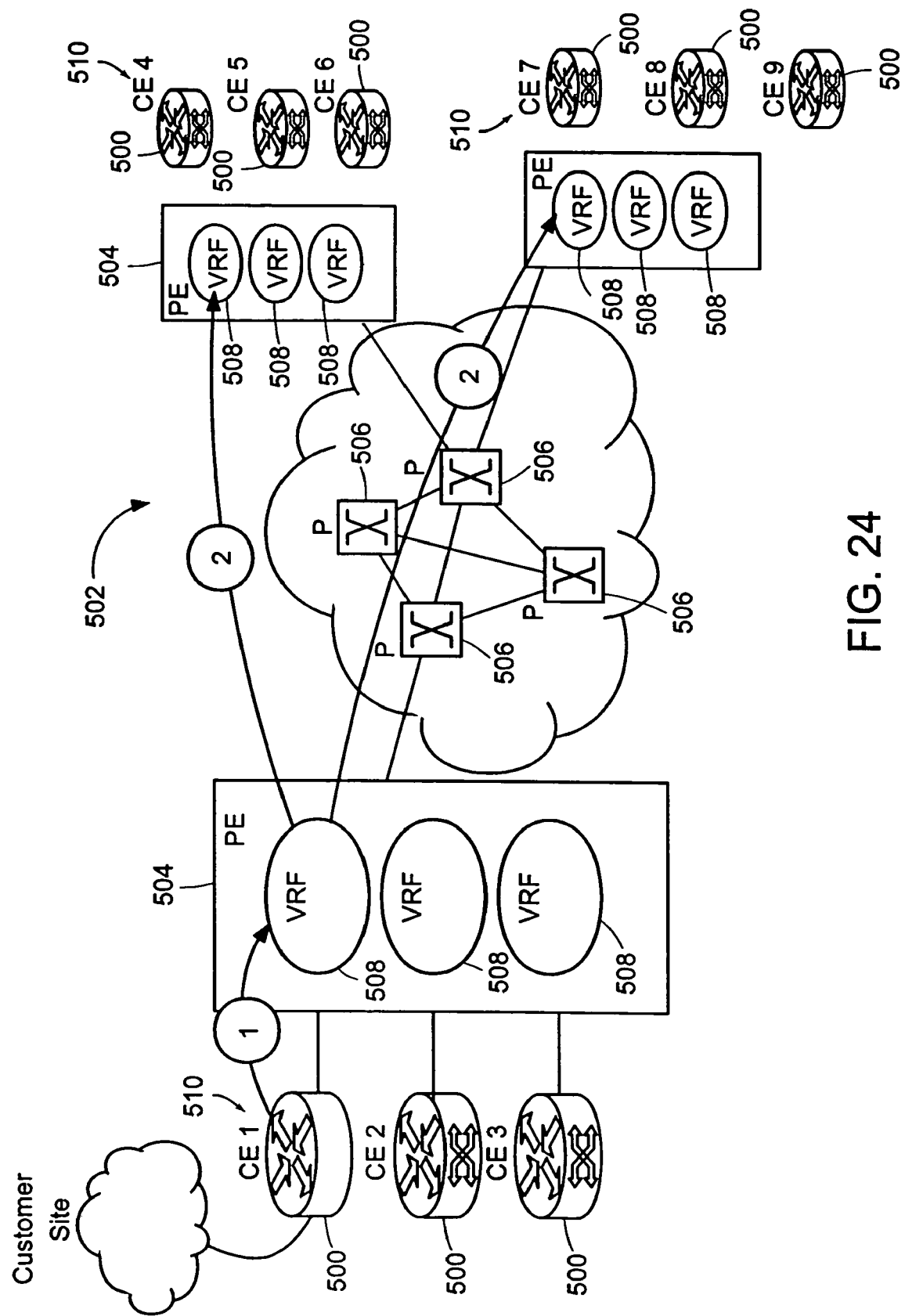
FIG. 24 is a schematic representation of a network implementing a 2547 BGP MPLS VPN.

The principles of the invention are further applicable to RFC 2547 BGP MPLS VPNs, described in [2547bis] Rosen et al., "BGP/MPLS VPNs", draft-ietf-ppvpn-rfc2547bis-03.txt, October 2002—hereinafter referred to as 2547 BGP VPNs. Referring to FIG. 24, a 2547 BGP VPN defines two roles: the customer, who is the user of provider networking services; and the provider, who is the operator of the network. Three classes of networking platforms support these roles:

CE: Customer Edge. The CE 500 is the customer networking device directly attached to the provider network 502.

PE: Provider Edge. The PE 504 is the service aware provider networking device interposed between the CE 500 and the provider's core network element 506s.

P: Provider network elements. The P's 506 are the service unaware switching/routing devices that simply forward traffic through the provider core and are VPN service unaware.

The PE 504 instantiates virtual entities known as Virtual Routing and Forwarding engines (VRFs) 508 to communicate with each CE. Each VRF 508 exchanges routing information with a respective CE 500 to obtain a view of the customer network topology behind the CE device. This information is used to build a local routing table associated with the PE-CE interface. The PE 504 uses the Border Gateway Protocol (BGP-4) to flood copies of the VRF routing table to other PEs 504 in the network that communicate to other customer sites within the VPN. The routing table is associated with a per-platform MPLS label that maps to the interface to which the CE 500 is connected. This may be in the form of what is known as an "aggregated label LSP" in which multiple customer routers are associated a single label, or as a "non-aggregated label LSP" in which each customer route has a unique label. Thus, other VRFs 508 in the VPN have sufficient information to know which packets to forward to the customer site via the originating VRF and respective CE. MPLS is commonly used to forward VPN traffic across the core to remote VPN sites, though other protocols may be used. As shown in FIG. 24, CEs 1, 4, and 7 are members of a VPN 510. The VRF 508 in PE1 builds a routing table via protocol exchange with the CE1 (line labeled '1'). It advertises the routing table to all other VRFs 508 in the VPN 510 via BGP (line labeled '2').

In accordance with the principles of the invention, probes containing knowledge digests can be exchanged between 2547 VRFs in order to verify: synchronization of views of the VRF forwarding tables; correct configuration of the VRFs; and correct functioning of the MPLS connectivity between VRFs (i.e. traffic is not being misdirected) and availability of customer routes is synchronized across PEs.

Figure 25:
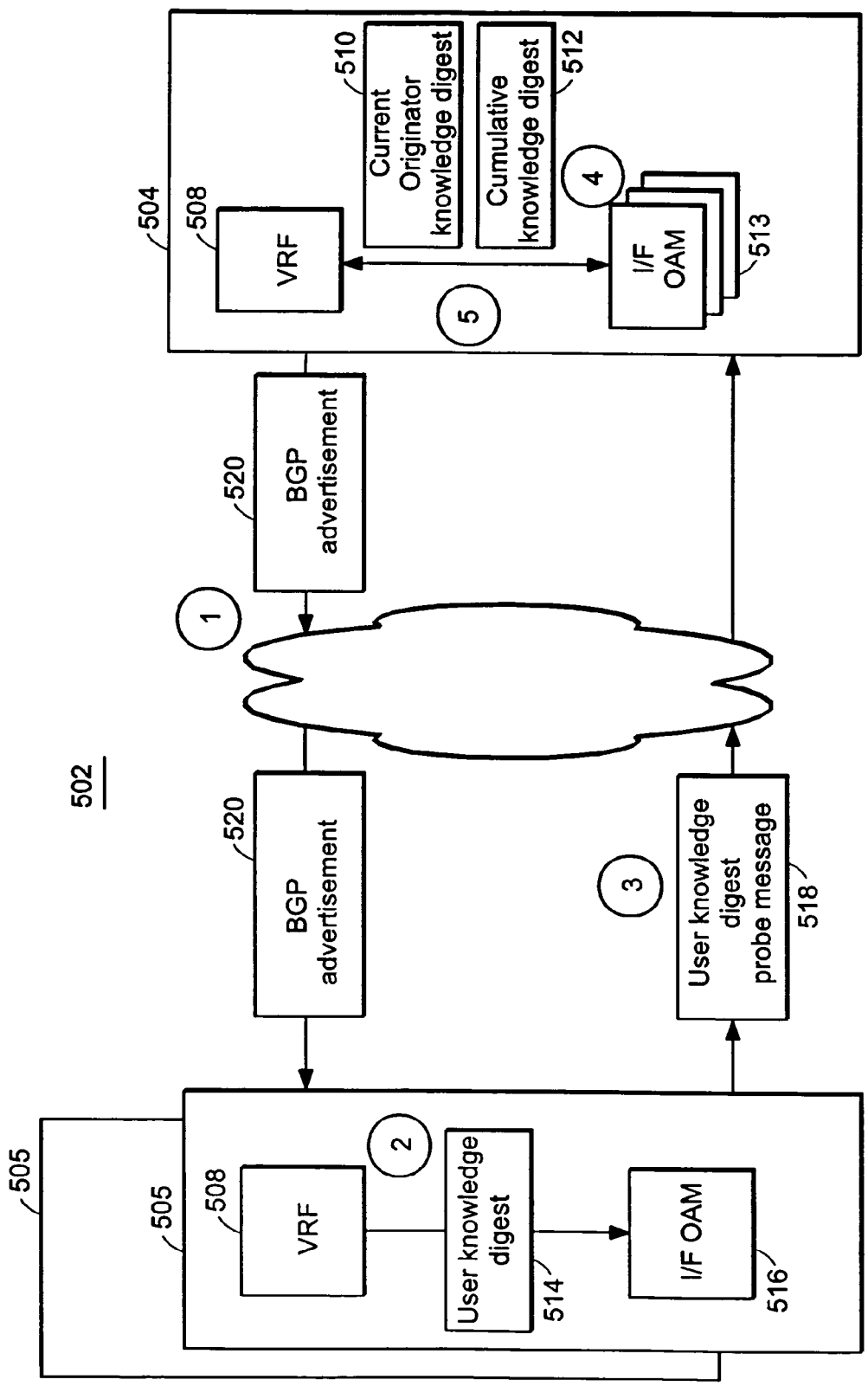
FIG. 25 is a schematic representation of a 2547 BGP MPLS VPN in which a probe message in accordance with the principles of the invention is used to verify configuration.

Referring now to FIG. 25, the invention operates in a 2547 VPN environment as follows:

1) The originating PE 504 constructs two knowledge digests per VRF 508. The current knowledge digest 510 corresponds to the current set of information advertised for the VRF 508. This would include but not be limited to the route distinguisher (RD)—used to create distinct routes to a common IP address; the VRF loopback address, and may include one or more VRF forwarding table entries. The cumulative knowledge digest 512 corresponds to the cumulative set of information advertised (the difference being additional forwarding table entries). The knowledge digests are loaded into an OAM interface 513.

2) The originating VRF 508 advertises configuration information to the user VRFs via BGP advertisement 520

3) The user PEs 505 construct a user knowledge digest 514 per originating VRF 508 containing the set of information received from BGP. The user knowledge digest 514 is loaded into an OAM interface 516.

4) The user PEs 505 periodically send a copy of their user knowledge digest 514 to the originating PE 505 in a probe message 518 using the LSP associated with the VRF/PE combination. The probe message 518 may be a variation of the FEC-CV message previously described, or may be a message associated with any other protocol. Note that implementation simplicity suggests that use of a common message design for FEC-CV would be the most advantageous instantiation for MPLS.

5) Upon receipt of a probe message containing a digest, the originator executes the process previously described in FIG. 5 to verify:
  correct configuration of the user VRF
  correct connectivity with the user VRF
  end to end synchronization of information with user VRF
  The user and originator knowledge digests are conveniently implemented as bloom filters.

It should be noted that numerous variations of RFC 2547 exist. For example, VRFs can be identified via unique IPv6 addresses instead of MPLS labels. GRE or other tunneling mechanisms may be used instead of MPLS. The principles of the invention are broadly applicable to the verification of BGP VPNs regardless of the transport layer employed.

It should also be noted that 2547 BGP VPNs are an overlay on an LDP MPLS network. So, besides inter-VPN leakage, leakage into lower layers may also occur, for example into the LDP or RSVP-TE layers. Thus, it is advantageous to combine the VPN leakage detection described herein with the other leakage detections described herein.

3. Pseudo-Wires

The principles of the invention are further applicable to what are known as "Pseudo wires", which is the emulation of services (such as ATM, FR, TDM etc.) over tunnels, commonly instantiated as MPLS LSPs. These are frequently implemented as point to point, therefore the basic operation as outlined in FIG. 1 is applicable.

In all environments in which the principles of the invention may be applied, simple hardware implemented on each interface of an ingress and egress device can be used to compare the bloom filters necessary for configuration testing, so that the central processor need not perform the necessary calculations for all interfaces. The simplicity of the Boolean test allows it to be executed at very high speeds. Thus, the invention herein described provides a highly scalable means of testing configuration, connectivity, and other attributes of tunnels at line-rate speeds.

In accordance with a further aspect of the invention, in some or all of the environments in which the invention may be applied, it can be useful at times to implement non-repudiation of the probe messages containing the knowledge filters. This provides a way for a user network device to verify that a probe message was actually sent from an originator network device, and vice-versa, and thus is not a spoof or other form of malicious or erroneous message. Accordingly, when hashing a token to produce a bloom filter, each token is concatenated with a secret key shared between the user and originator. Filter comparisons will only match (or appear as a subset) if the keys match. Thus, further security is provided.

Figure 26:
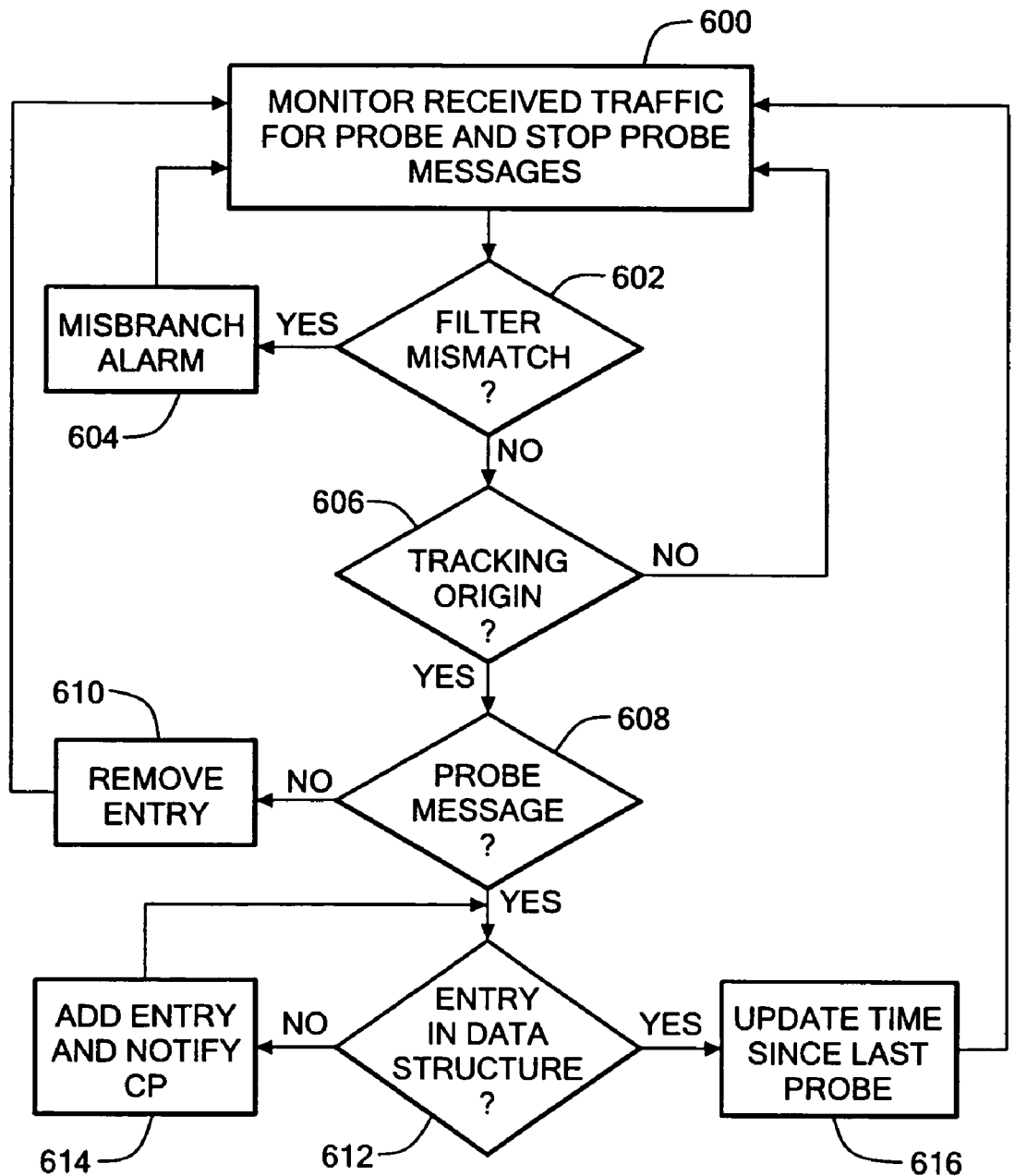
FIG. 26 is a flow chart illustrating steps performed in an egress LSR in an alternative embodiment to track connectivity on an ingress access point basis.

FIG. 26 is a flow chart illustrating steps performed in an egress LSR in an alternative embodiment to track connectivity on an ingress access point basis. Additional procedures are required as the egress LSR tracks connectivity at a granularity finer than the nodal level and the ingress LSRs may choose to modify the set of ingress points used over time. At step 600, the egress LSR monitor received traffic to identify received probe messages (FEC-CV) and stop probe (stop FEC-CV) messages. When either a probe or stop probe message is detected, at step 602 the egress LSR determines whether there is a mismatch between the contents of a bloom filter field in the message and a previously stored bloom filter value for the LSP. The determination of whether there is a bloom filter mismatch in step 602 of FIG. 26 may, for example, be performed as described for step 252 of FIG. 17. A bloom filter mismatch determined at step 602 results in step 602 being followed by step 604, in which a misbranch alarm is generated. Step 604 is followed by step 600.

If no bloom filter mismatch is detected, then step 602 is followed by step 606, in which the receiving system branches dependent on whether it is an origin for tracking information, such as configuration information, that may be distributed to other devices. If the receiving system is not an origin of such tracking information, then step 606 is followed by step 600. Otherwise, step 606 is followed by step 608.

At step 608, a determination is made as to whether the received message is an FEC-CV probe. If not, then the received message is determined to be a stop FEC-CV message, and step 608 is followed by step 610. At step 610, the disclosed system removes an entry associated with the contents of the TTSI field (142 in FIG. 16) in the message from a tracking data structure. The tracking data structure may be a table having entries corresponding to TTSI values, a list of TTSI values associated with an LSP, or some other appropriate data structure enabling tracking of FEC-CV probes based on full TTSI values. Accordingly, the receipt of a stop FEC-CV message terminates monitoring of FEC-CV probes corresponding to a TTSI value stored in the stop FEC-CV message.

In the event that the received message is an FEC-CV probe message, step 608 is followed by step 612, in which a determination is made as to whether there is an entry in the tracking data structure associated with the value of the TTSI field in the received message. If not, then step 612 is followed by step 614, in which tracking of FEC-CV probes associated with the TTSI field value is initiated. Initiation of such tracking may, for example, include adding an entry associated with the value of the TTSI field in the received message to the tracking data structure, and notifying a central processor of the initiation of tracking of FEC-CV probes associated with that TTSI.

Otherwise, step 612 is followed by step 616, in which a timer maintaining a time since the receipt of the last FEC-CV probe for that TTSI is updated, for example by setting the timer to zero. The time since receipt of a last FEC-CV probe is maintained for use a background process as described in FIG. 27.

Figure 27:
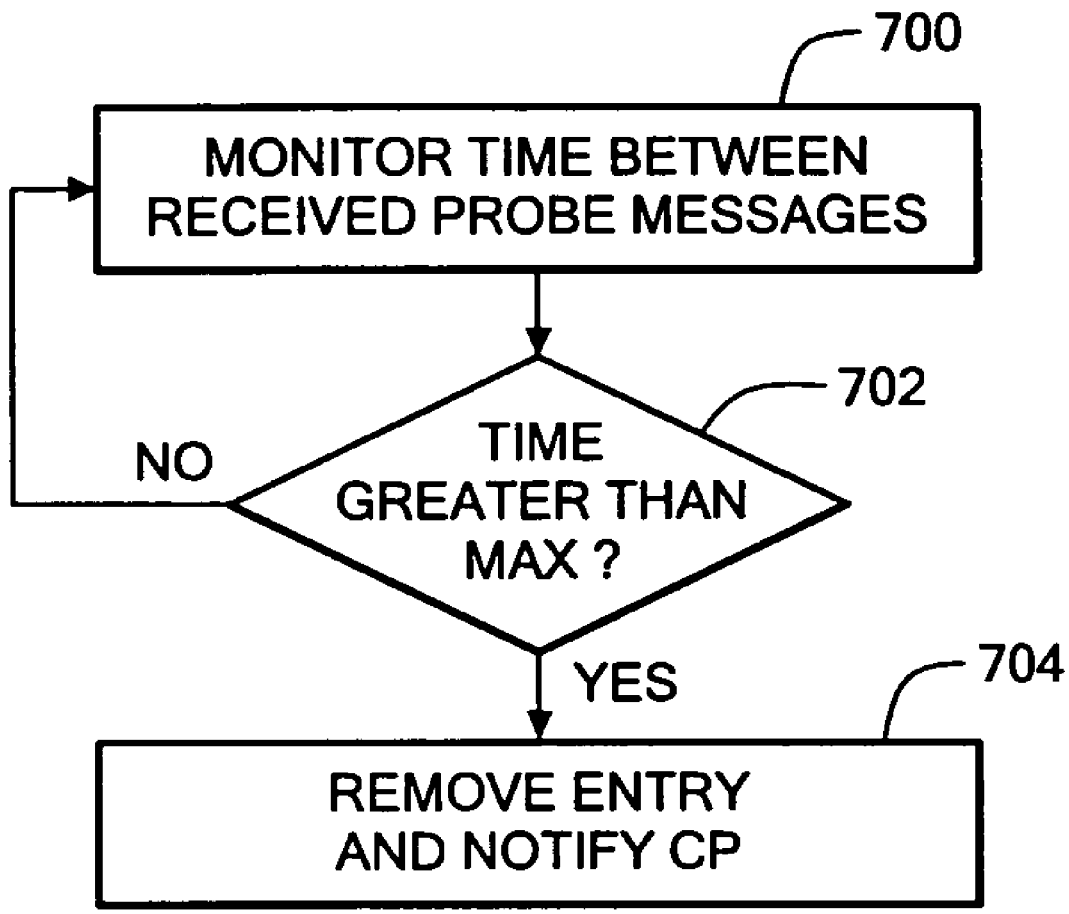
FIG. 27 is a flow chart illustrating steps performed in an egress LSR to monitor times between receipt of probe messages associated with corresponding ingress access points for the alternative embodiment of FIG. 26.

FIG. 27 is a flow chart illustrating steps performed in an egress LSR to monitor times between receipt of probe messages associated with corresponding ingress access points for the alternative embodiment of FIG. 27. At step 700, the disclosed system checks a time since a last FEC-CV probe was received for a given TTSI value. At step 702, a determination is made as to whether the time since a last FEC-CV probe was received for that TTSI value is greater than a predetermined maximum time. For example, a maximum time in this regard might be three times the time between transmission of FEC-CV probes from ingress systems in an exemplary embodiment. In the event that the time since a last FEC-CV probe was received for that TTSI is greater than the predetermined maximum, the disclosed system operates at step 704 to remove an entry associated with the TTSI from a tracking data structure, and notifies a central processor of the event.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. As has been described, MPLS FECs may encode various types of forwarding policy information, such as common destination prefixes, or such as common quality or class of service information. However, forwarding policy information may be encoded in other ways. For example, in MPLS networks that implement DiffServ, DiffServ scheduling classes (PSCs) can be verified using the principles of the invention. DiffServ PSCs define groups of packets that receive common quality of service or class of service treatment. PSC information would be encoded in a similar format to the existing FEC information. The PSC information would then be used to populate the bloom filters. One skilled in the art will realize from the teachings herein that the principles of the invention are applicable beyond MPLS networks. Other types of networks associate configuration information with packet switched connections, or simply between any pair of end systems. For example, ATM networks associate configuration information with channel and path connections. The mechanisms of the present invention could be employed to audit, for example, VCC traffic management and quality of service characteristics that are programmed into individual ATM switches. In such networks, it may be advantageous to encode the configuration information associated with a path through the network in a fixed-length bit array such as a bloom filter so that the ATM switches along the path can verify that they are receiving packets in accordance with the proper traffic management or QoS configuration. Similarly MPLS LSPs can be considered to be a specific instantiation of the concept of "tunnels". The mechanisms in the invention have applicability to "tunnels" in general, such as IPSEC, L2TP, GRE or other such tunneling mechanisms. Furthermore, the invention is not confined to simple one way probing between the user and originator. Loopback or Ping type transactions may also benefit from the use of knowledge digests that permit the user to probe originators and make their own determination as to the existence of a problem. One skilled in the art will also realize from the teachings herein that bloom filters can advantageously be used to verify forwarding policy in any environment where information is forwarded from one device to another based upon forwarding policy rules. The logical functions have been described generally herein, yet the skilled artisan will realize that the functionality of the described logic may in fact be partitioned amongst several different controllers, or may all be included within a single controller. Though most advantageously implemented in hardware when applied in an MPLS environment, the invention may also be implemented in software in MPLS or other environments. All such modifications are intended to fall within the scope of the following appended claims. Accordingly, the claims set forth below should be construed in view of the full breadth and spirit of the present invention as disclosed herein.

I claim:

1. A method for determining the connectivity of a communication path in a communication network, comprising:
   monitoring received traffic at an egress network device, wherein said monitoring includes detecting a received probe message, wherein said received probe message indicates an ingress access point, said ingress access point including an identifier of an ingress network element and a path identifier;
   determining, responsive to said detecting of said received probe message, whether said egress network device is currently tracking probe messages indicating said ingress access point, wherein said determining includes determining whether a data structure entry associated with said ingress access point indicated by said received probe message currently exists in a tracking data structure stored in said egress network device, such that said egress network device is determined to not be currently tracking probe messages indicating said ingress access point responsive to determining that a data structure entry associated with said ingress access point indicated by said received probe message does not currently exist in said tracking data structure; and
   in the event that probe messages indicating said ingress access point are not currently being tracked, initiating tracking at said egress network device of probe messages indicating said ingress access point, wherein said initiating tracking at said egress network device includes adding a data structure entry associated with said ingress access point indicated by said received probe message to said tracking data structure, wherein said data structure entry includes an indication of a last time at which a probe message was received at said egress network device from said ingress access point.

2. The method of claim 1, wherein said initiating tracking at said egress network device includes storing an initial copy of a knowledge digest in said data structure entry associated with said ingress access point, wherein said knowledge digest includes a number of policy indicators.

3. The method of claim 2, further comprising comparing a knowledge digest contained in a subsequent one of said probe messages indicating said ingress access point with said stored knowledge digest.

4. The method of claim 1, further comprising:
   in the event that probe messages indicating said ingress access point are currently being tracked, determining, responsive to said indication of a last time at which a probe message was received at said egress network device from said ingress access point, an amount of time since a previous one of said probe messages indicating said ingress access point was received at said egress network device; and
   in the event said amount of time exceeds a predetermined maximum, terminating tracking of said probe messages indicating said ingress access point.

5. The method of claim 4, wherein said terminating includes removing said data structure entry associated with said ingress access point from a tracking data structure.

6. The method of claim 1, further comprising:
   wherein said monitoring received traffic at said egress network device includes detecting a received stop probe message at said egress network device, wherein said received stop probe message indicates said ingress access point by way of an identifier of an ingress network element and a path identifier contained in said received stop probe message;

determining, responsive to said detecting of said received stop probe message at said egress network device, whether said egress network device is currently tracking probe messages indicating said ingress access point; and in the event that probe messages indicating said ingress access point are currently being tracked by said egress network device, terminating tracking of probe messages indicating said ingress access point.

7. The method of claim 6, wherein said terminating includes removing said data structure entry associated with said ingress access point from said tracking data structure.

8. The method of claim 6, wherein said tracking includes storing a stored copy of a knowledge digest in said data structure entry associated with said ingress access point, wherein said knowledge digest includes a number of policy indicators, and further comprising comparing a knowledge digest contained in said stop probe message indicating said ingress access point with said stored knowledge digest.

9. The method of claim 1, wherein said connectivity of said communication path in said communication network comprises presence of a viable communication path and an available route at said ingress network element.

10. A system for determining connectivity of a communication path in a communication network, comprising at least one processor and memory storing logic executed on said processor, said logic comprising:

logic for monitoring received traffic at an egress network device, wherein said monitoring includes detecting a received probe message, wherein said received probe message indicates an ingress access point, said ingress access point including an identifier of an ingress network element and a path identifier;

logic for determining, responsive to said detecting of said received probe message, whether said egress network device is currently tracking probe messages indicating said ingress access point, wherein said determining includes determining whether a data structure entry associated with said ingress access point indicated by said received probe message currently exists in a tracking data structure stored in said egress network device, such that said egress network device is determined to not be currently tracking probe messages indicating said ingress access point responsive to determining that a data structure entry associated with said ingress access point indicated by said received probe message does not currently exist in said tracking data structure; and logic for, in the event that probe messages indicating said ingress access point are not currently being tracked, initiating tracking at said egress network device of probe messages indicating said ingress access point, wherein said initiating tracking at said egress network device includes adding a data structure entry associated with said ingress access point indicated by said received probe message to said tracking data structure, wherein said data structure entry includes an indication of a last time at which a probe message was received at said egress network device from said ingress access point.

11. The system of claim 10, wherein said logic for initiating tracking at said egress network device includes logic for storing an initial copy of a knowledge digest in said data structure entry associated with said ingress access point, wherein said knowledge digest includes a number of policy indicators.

12. The system of claim 11, further comprising logic for comparing a knowledge digest contained in a subsequent one of said probe messages indicating said ingress access point with said stored knowledge digest.

13. The system of claim 10, further comprising:

logic for determining, in the event that probe messages indicating said ingress access point are currently being tracked, responsive to said indication of a last time at which a probe message was received at said egress network device from said ingress access point, an amount of time since a previous one of said probe messages indicating said ingress access point was received at said egress network device; and logic for, in the event said amount of time exceeds a predetermined maximum, terminating tracking of said probe messages indicating said ingress access point.

14. The system of claim 13, wherein said logic for terminating includes logic for removing said data structure entry associated with said ingress access point from said tracking data structure.

15. The system of claim 10, further comprising:

wherein said logic for monitoring received traffic at said egress network device includes logic for detecting a received stop probe message at said egress network device, wherein said received stop probe message indicates said ingress access point by way of an identifier of an ingress network element and a path identifier contained in said received stop probe message;

logic for determining, responsive to said detecting of said received stop probe message at said egress network device, whether said egress network device is currently tracking probe messages indicating said ingress access point; and logic for, in the event that probe messages indicating said ingress access point are currently being tracked by said egress network device, terminating tracking of probe messages indicating said ingress access point.

16. The system of claim 15, wherein said logic for terminating includes logic for removing said data structure entry associated with said ingress access point from said tracking data structure.

17. The system of claim 15, wherein said logic for tracking includes logic for storing a an initial copy of a knowledge digest in said data structure entry associated with said ingress access point, wherein said knowledge digest includes a number of policy indicators, and further comprising comparing a knowledge digest contained in said stop probe message indicating said ingress access point with said stored knowledge digest.

18. The system of claim 10, wherein said connectivity of said communication path in said communication network comprises presence of a viable communication path and an available route at said ingress network element.

19. A system for determining availability of a communication path in a communication network, comprising:

means for monitoring received traffic at an egress network device, wherein said monitoring includes detecting a received probe message, wherein said received probe message indicates an ingress access point, said ingress access point including an identifier of an ingress network element and a path identifier;

means for determining, responsive to said detecting of said received probe message, whether said egress network device is currently tracking probe messages indicating said ingress access point, wherein said determining includes determining whether a data structure entry associated with said ingress access point indicated by said received probe message currently exists in a tracking data structure stored in said egress network device, such that said egress network device is determined to not be currently tracking probe messages indicating said ingress access point responsive to determining that a data structure entry associated with said ingress access point indicated by said received probe message does not currently exist in said tracking data structure; and means for, in the event that probe messages indicating said ingress access point are not currently being tracked, initiating tracking at said egress network device of probe messages indicating said ingress access point, wherein said initiating tracking at said egress network device includes adding a data structure entry associated with said ingress access point indicated by said received probe message to said tracking data structure, wherein said data structure entry includes an indication of a last time at which a probe message was received from said ingress access point with a time said received probe message was received at said egress network device.

* * * * *